(12) United States Patent
Stauth et al.

(10) Patent No.: US 12,512,767 B2
(45) Date of Patent: Dec. 30, 2025

(54) SEQUENTIAL ELECTRICAL DRIVING CIRCUITS AND ASSOCIATED METHODS

(71) Applicant: THE TRUSTEES OF DARTMOUTH COLLEGE, Hanover, NH (US)

(72) Inventors: Jason Stauth, Hanover, NH (US); Yanqiao Li, Lebanon, NH (US)

(73) Assignee: THE TRUSTEES OF DARTMOUTH COLLEGE, Hanover, NH (US)

( * ) Notice: Subject to any disclaimer, the term of this patent is extended or adjusted under 35 U.S.C. 154(b) by 763 days.

(21) Appl. No.: 17/794,586

(22) PCT Filed: Jan. 20, 2021

(86) PCT No.: PCT/US2021/014242
§ 371 (c)(1),
(2) Date: Jul. 21, 2022

(87) PCT Pub. No.: WO2021/150642
PCT Pub. Date: Jul. 29, 2021

(65) Prior Publication Data
US 2023/0085253 A1    Mar. 16, 2023

Related U.S. Application Data

(60) Provisional application No. 62/963,829, filed on Jan. 21, 2020.

(51) Int. Cl.
*H02M 7/483* (2007.01)
*H02J 1/08* (2006.01)
(Continued)

(52) U.S. Cl.
CPC .......... *H02M 7/4837* (2021.05); *H02J 1/082* (2020.01); *H02J 7/0063* (2013.01); *H02M 1/08* (2013.01); *H02M 3/07* (2013.01); *H02J 2207/50* (2020.01)

(58) Field of Classification Search
CPC ........ H02M 7/4837; H02M 1/08; H02M 3/07; H02M 1/0003; H02J 1/082; H02J 7/0063; H02J 2207/50
(Continued)

(56) References Cited

U.S. PATENT DOCUMENTS 9,793,794 B2    10/2017    Stauth et al.
2011/0101787 A1    5/2011    Gaul
(Continued)

OTHER PUBLICATIONS

International Search Report and Written Opinion of the International Searching Authority for International Patent Application No. PCT/US2021/014242 dated Apr. 1, 2021, 10 pages.
(Continued)

*Primary Examiner* — Paul Dinh
(74) *Attorney, Agent, or Firm* — Cozen O'Connor

(57) ABSTRACT

A method for sequentially driving an electrical load includes (a) controlling N switching cells, where each of the N switching cells is electrically coupled to a respective one of N energy elements, such that the N energy elements are electrically coupled in a first topology to drive the electrical load with a first voltage, N being an integer greater than one, and (b) controlling the N switching cells such that N energy elements are electrically coupled in a second topology that is different from the first topology, to drive the electrical load with a second voltage that is different from the first voltage.

27 Claims, 19 Drawing Sheets

(51) Int. Cl.
    H02J 7/00    (2006.01)
    H02M 1/08    (2006.01)
    H02M 3/07    (2006.01)
(58) Field of Classification Search
    USPC .......................................................... 320/166
    See application file for complete search history.

(56)         References Cited

U.S. PATENT DOCUMENTS

2013/0162307  A1    6/2013   Bhattacharya et al.
2016/0226247  A1    8/2016   Stratakos et al.
2016/0344287  A1   11/2016   Stauth et al.
2022/0103093  A1*   3/2022   Tsuda ................... H02M 1/0077
2022/0182046  A1*   6/2022   Shterzer ................... H03K 3/53

OTHER PUBLICATIONS

Andersen, T. et al., "A 4.6 W/mm2 Power Density 86% Efficiency On-Chip Switched Capacitor DC-DC Converter in 32nm SOI CMOS", IEEE Proceedings of the 28$^{th}$ Applied Power Electronics Conference and Exposition (APEC 2013), 692-699 (2013).

Bellew, C. et al., "An SOI Process for Fabrication of Solar Cells, Transistors and Electrostatic Actuators", Transducers, The 12$^{th}$ International Conference on Solid State Sensors, Actuators and Microsystems, 1075-1079 (2003).

Karpelson, M. et al., "A Review of Actuation and Power Electronics Options for Flapping-Wing Robotic Insects", 2008 IEEE International Conference on Robotics and Automation, 779-783 (2008).

Karpelson, M. et al., "Milligram-Scale High-Voltage Power Electronics for Piezoelectric Microrobots", 2009 IEEE International Conference on Robotics and Automation, 2217-2224 (2009).

Karpelson, M. et al., "Low Power Control IC for Efficient High-Voltage Piezoelectric Driving in a Flying Robotic Insect", 2011 Symposium on VLSI Circuits Digest of Technical Papers, 178-179 (2011).

Schaef, C. et al., "A Highly-Integrated Series-Parallel Switched-Capacitor Converter with 12-Volt-Input and Quasi-Resonant Voltage-Mode Regulation", IEEE Journal of Emerging and Selected Topics in Power Electronics, 6(2): 456-464 (2018).

Seeman, M. et al., "Analysis and Optimization of Switched-Capacitor DC-DC Converters", IEEE Transactions on Power Electronics, 23(2): 841-851 (2008).

Steltz, E. et al., "Power Electronics Design Choice for Piezoelectric Microrobots", Proceedings of the 2006 IEEE/RSJ International Conference on Intelligent Robots and Systems, 1322-1328 (2006).

* cited by examiner

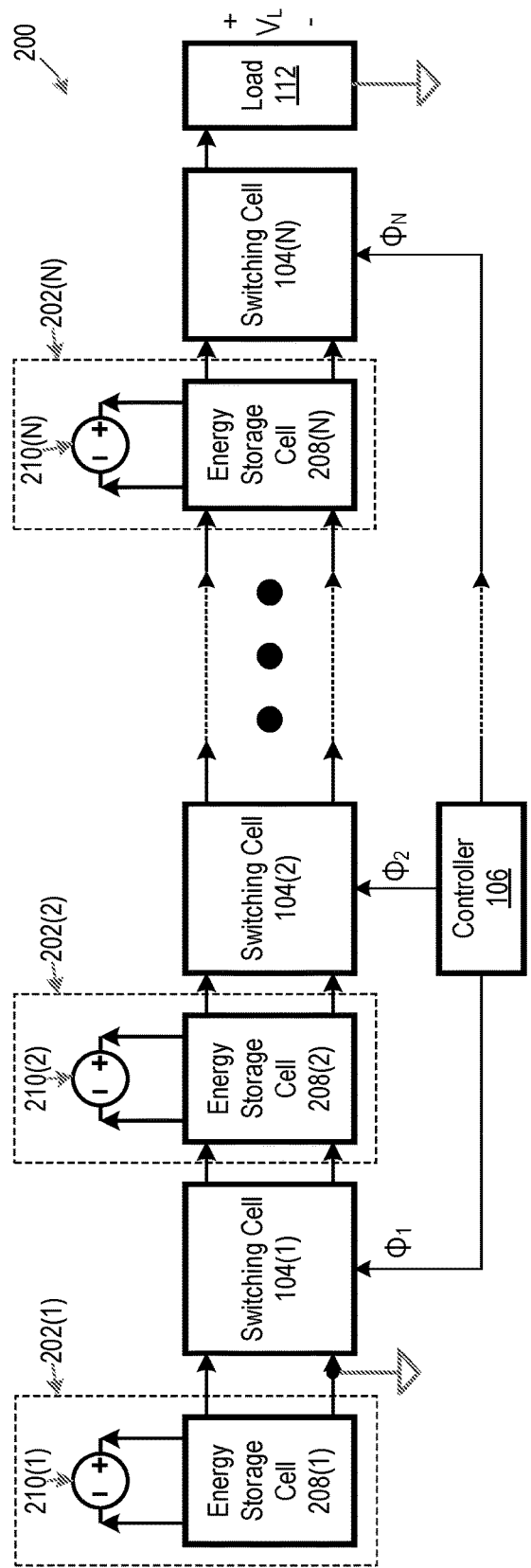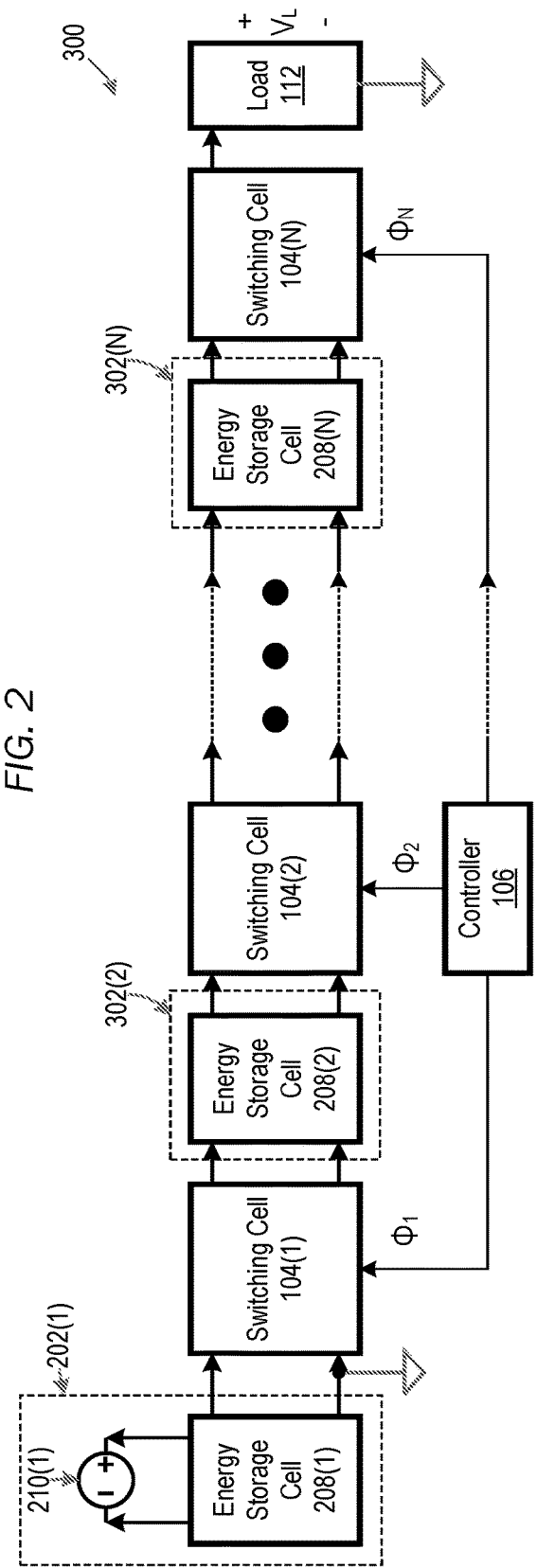

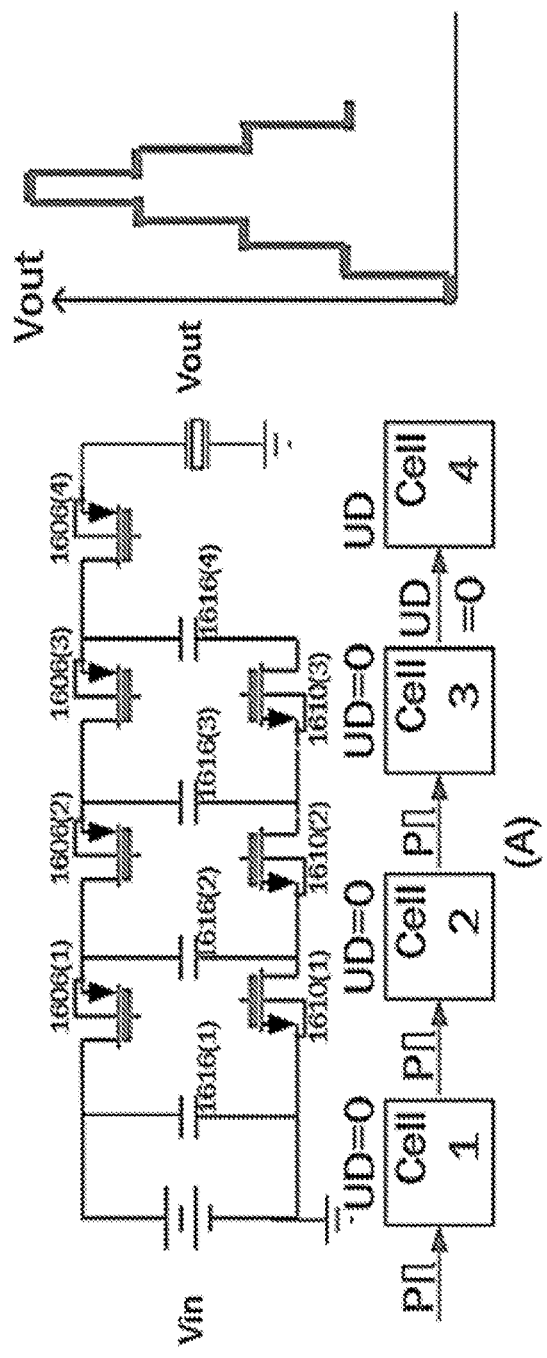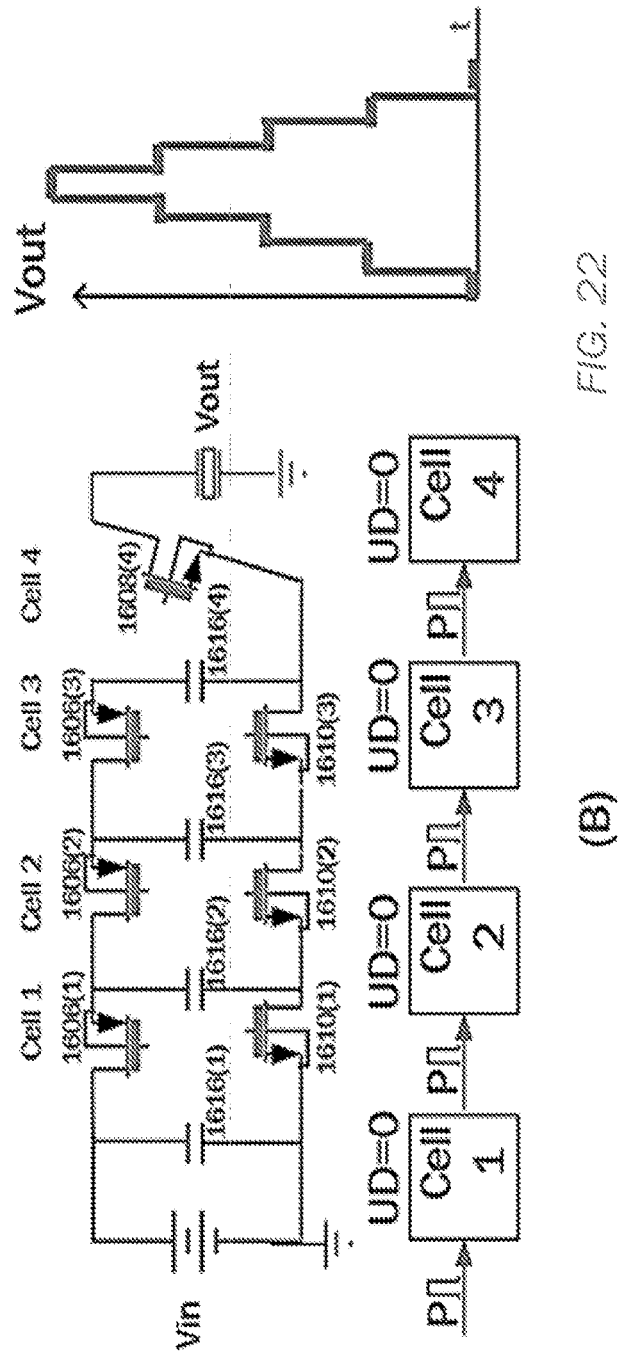
FIG. 22

SEQUENTIAL ELECTRICAL DRIVING CIRCUITS AND ASSOCIATED METHODS

RELATED APPLICATIONS

This Application is a 35 U.S.C. $371 filing of International Application No. PCT/US2021/014242, filed Jan. 20, 2021, which claims benefit of priority to U.S. Provisional Patent Application Ser. No. 62/963,829, filed Jan. 21, 2020, which is incorporated herein by reference.

GOVERNMENT RIGHTS

This invention was made with government support under grant no. HR001119C0040 awarded by the Defense Advanced Research Projects Agency. The government has certain rights in the invention.

BACKGROUND

There are many applications of electrical driving circuits. For example, electrical driving circuits may be used in electromechanical applications to drive mechanical transducers, such as piezoelectric devices or electrostatic actuators. Electrical driving circuits may also be used in sonic applications, such as to drive audio speakers or ultrasound transmitters. Additionally, electrical driving circuits may be used to drive power semiconductor devices, such as gates of metal oxide semiconductor field effect transistors (MOSFETs) or gates of insulated gate bipolar junction transistors (IGBTs).

An electrical load may be capacitive, inductive, and/or resistive. Consequently, an electrical driving circuit may need to charge and discharge a capacitive load. A capacitive load is conventionally driven, for example, by a "hard charging" electrical driving circuit which directly switches the capacitive load between two voltage levels, such as between a drive voltage and ground.

SUMMARY

The embodiments herein provide system and methods for sequential electrical driving circuits and associated methods. The electrical driving circuits include N switching cells, where N is an integer greater than one. Each of the N switching cells are electrically coupled to a respective energy element, and each of the N switching cells is individually controllable to operate at least in a series or parallel operating state. Each energy element includes, for example, an energy storage cell and/or an electrical source of energy. A controller is configured to collectively control the N switching cells to realize a plurality of different electrical topologies of the energy elements and thereby drive the electrical load at different voltages. In some embodiments the controller may be distributed wherein each cell contains a separate control element which is interconnected to the other cell control elements. In this manner cell to cell isolation may be maintained so that voltage stress is minimized across each individual cell. In some embodiments, the controller is configured to control the switching cells as a time sequence of operating states and thereby drive the electrical load with a time sequence of different voltages, such that the load is driven with a voltage having an alternating (AC) component. The system can transfer energy from input to output and can also absorb energy from the output and store it locally within the cells so that it will not pass energy back to the input source. The Input source may be a primary battery, or a photovoltaic source. In some embodiments the input source may be fed energy back from the load. This system may be used to drive AC or DC loads containing inductance, capacitance, and resistance. The output may be a piezoelectric or Haptic device.

BRIEF DESCRIPTION OF THE DRAWINGS

FIG. 2 is a block diagram of an embodiment of the FIG. 1 sequential electrical driving circuit where each energy element includes a respective energy storage cell and a respective electrical power source.

FIG. 3 is a block diagram of an alternate embodiment of the FIG. 2 sequential electrical driving circuit where some energy elements do not include an electrical power source.

FIG. 22 is a diagram illustrating a further step-down state of the distributed control topology of FIG. 16, in embodiments.

DETAILED DESCRIPTION OF THE EMBODIMENTS

A conventional hard charging electrical driving circuit incurs the following charge-sharing power loss ($P_{HS}$) when charging and discharging a capacitive load $C_x$, where $V_{dr}$ is the magnitude of voltage switched across the capacitive load and $f_{sw}$ is switching frequency:

$$P_{HS}=C_x*V_{dr}^2*f_{sw} \quad (\text{EQN. 1})$$

As evident from EQN. 1, $P_{HS}$ can be large if at least one of $C_x$, $V_{dr}$, and $f_{sw}$ is large. Such charge-sharing power loss may be highly undesirable, particularly in applications which are heat-sensitive and/or have limited power availability.

Disclosed herein are sequential electrical driving circuits and associated methods which may achieve significant advantages over conventional electrical driving circuits. The new electrical driving circuits include N switching cells, where N is an integer greater than one. Each of the N switching cells is electrically coupled to a respective energy element, and each of the N switching cells is individually controllable to operate at least in a series or parallel operating state. Each energy element includes, for example, an energy storage cell and/or an electrical power source. A controller is configured to collectively control the N switching cells to realize a plurality of different electrical topologies of the energy elements and thereby drive the electrical load at different voltages. For example, the controller can cause voltage across the load to change by changing a respective operating state of one or more of the switching cells from a series operating state to a parallel operating state, or vice versa. In some embodiments, the controller is configured to control the switching cells to have a time sequence of operating states and thereby drive the electrical load with a time sequence of different voltages, such that the load is driven with a voltage having an alternating current (AC) component.

Figure 1:
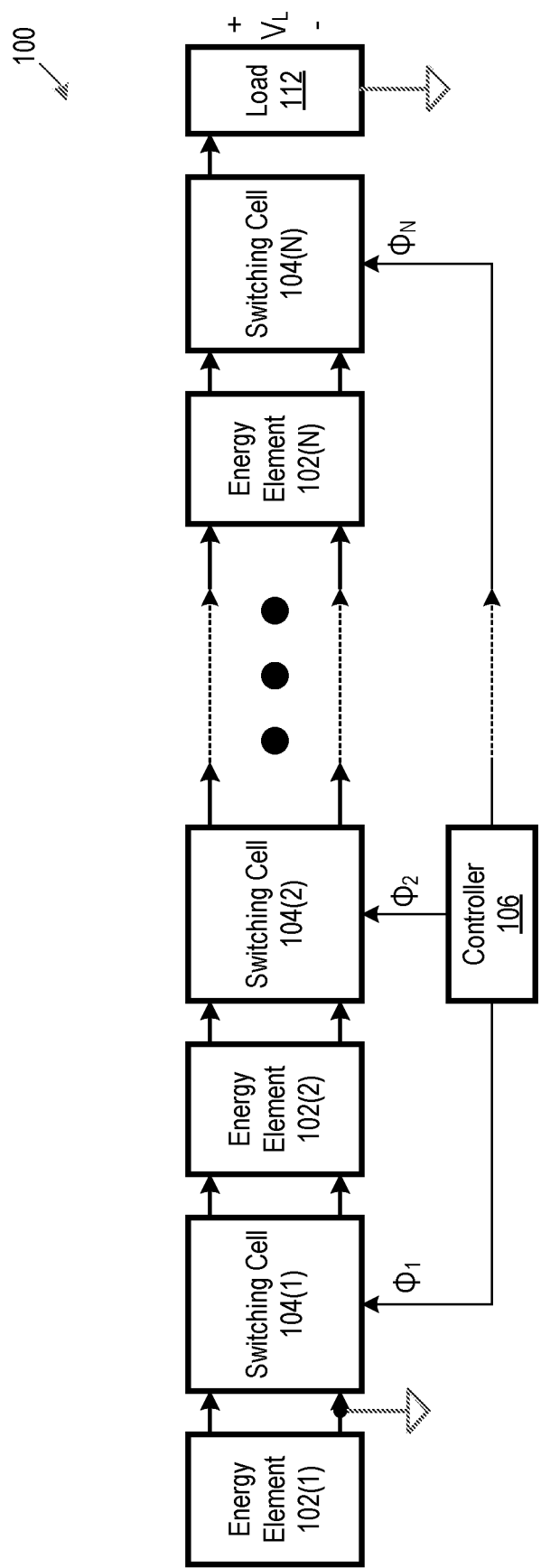
FIG. 1 is a block diagram of a sequential electrical driving circuit, according to an embodiment.

FIG. 1 is a block diagram of a sequential electrical driving circuit 100, which is one embodiment of the new sequential electrical driving circuits. Sequential electrical driving circuit 100 includes N energy elements 102, N switching cells 104, and a controller 106, where N is an integer greater than one. In this document, specific instances of an item may be referred to by use of a numeral in parentheses (e.g., energy element 102(1)) while numerals without parentheses refer to any such item (e.g., energy elements 102). Although FIG. 1 depicts N being greater than two, N could be equal to two without departing from the scope hereof. In some embodiments, some or all of N switching cells 104 are part of a common integrated circuit.

Each energy element 102 includes a respective energy storage cell and/or a respective electrical power source. For example, FIG. 2 is a block diagram of a sequential electrical driving circuit 200, which is an embodiment of sequential electrical driving circuit 100 where energy elements 102 are embodied by energy elements 202. Each energy element 202 includes a respective energy storage cell 208 and a respective electrical power source 210. Each energy storage cell 208 can store energy and deliver energy stored therein to connected circuitry. A respective electrical power source 210 is electrically coupled to each energy storage cell 208, for example, to provide electrical power to the energy storage cell. In some embodiments, each electrical power source 210 includes one or more of a power supply (e.g., a switching power supply or a linear power supply), a photovoltaic device, and a battery. Some alternate embodiments, however, do not include a respective electrical power source 210 for each energy storage cell 208.

For example, FIG. 3 is a block diagram of a sequential electrical driving circuit 300, which is an alternate embodiment of sequential electrical driving circuit 200 where energy elements 202(2)-202(N) are replaced with energy elements 302. Each energy element 302 includes a respective energy storage cell 208, but energy elements 302 do not include electrical power sources. Sequential electrical driving circuit 300 may be modified such that one or more instances of energy element 302 are replaced by an instance of energy element 202, as long as sequential electrical driving circuit 300 includes at least one instance of energy element 302. Additionally, sequential electrical driving circuit 300 may be modified such that energy element 202(1) is replaced with an instance of energy element 302, and one or more instances of energy element 302 are replaced with an instance of energy element 202, as long as sequential electrical driving circuit 300 includes at least one instance of energy element 302.

Figure 4:
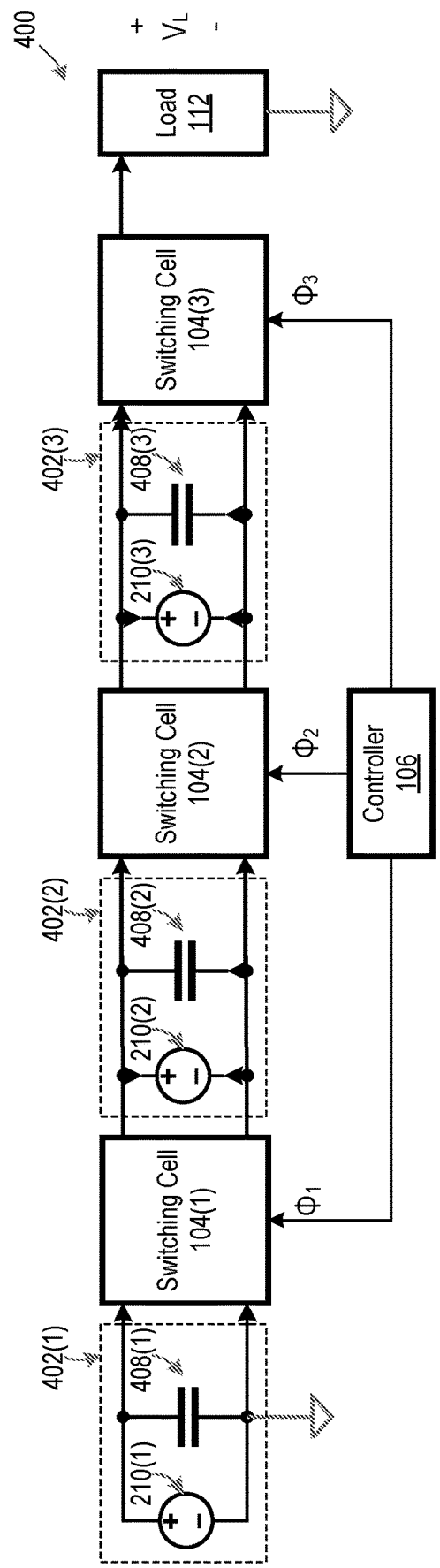
FIG. 4 is a block diagram of an embodiment of the FIG. 2 sequential electrical driving circuit where each energy storage cell is embodied by a capacitor.
Figure 5:
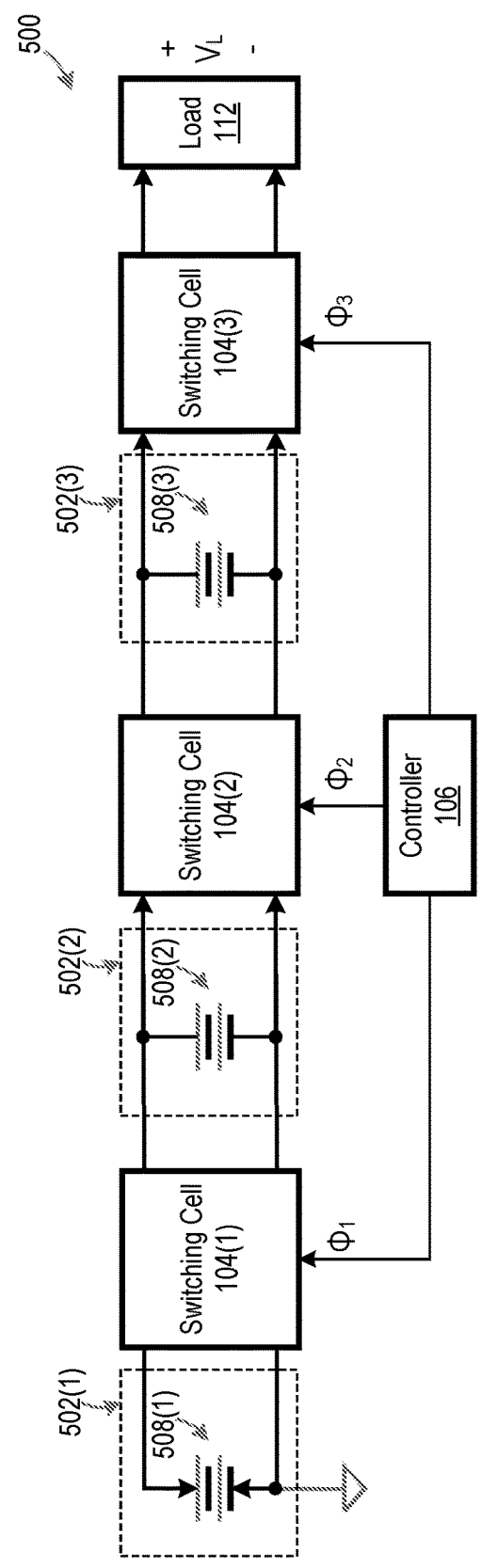
FIG. 5 is a block diagram of an embodiment of the FIG. 2 sequential electrical driving circuit where each energy storage cell is embodied by a battery.
Figure 6:
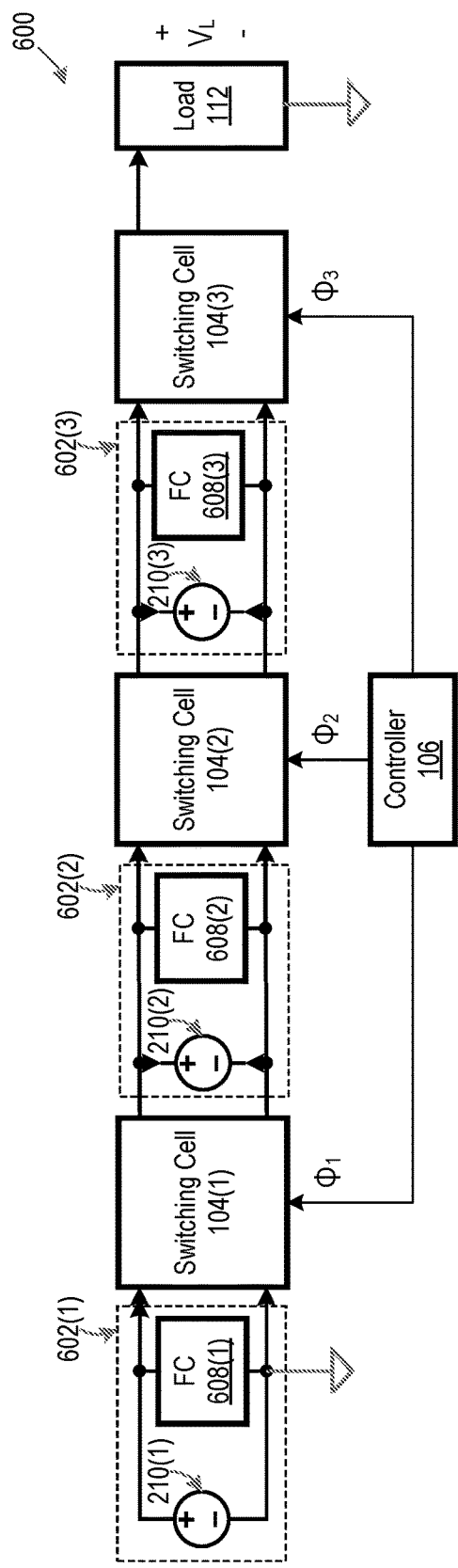
FIG. 6 is a block diagram of an embodiment of the FIG. 2 sequential electrical driving circuit where each energy storage cell is embodied by a fuel cell.

With reference to FIGS. 2 and 3, although each energy storage cell 208 is depicted as a single element, in some embodiments, each energy storage cell 208 includes two or more sub-elements, such as two or more energy storage sub-elements. In certain embodiments, each energy storage cell 208 includes a battery, a capacitor, and/or a fuel cell. For example, FIG. 4 is a block diagram of a sequential electrical driving circuit 400, which is an embodiment of sequential electrical driving circuit 200 where N is equal to three and each energy element 202 is embodied by an energy element 402 including a respective capacitor 408 and a respective electrical power source 210. As another example, FIG. 5 is a block diagram of a sequential electrical driving circuit 500, which is an embodiment of sequential electrical driving circuit 200 where N is equal to three and each energy element 202 is embodied by an energy element 502 including a respective battery 508. One or more instances of energy element 502 may be modified to include one or more electrical power sources without departing from the scope hereof. FIG. 6 is a block diagram of a sequential electrical driving circuit 600, which is an embodiment of sequential electrical driving circuit 200 where N is equal to three and each energy element 202 is embodied by an energy element 602 including a fuel cell 608 and an electrical power source 210.

Figure 7:
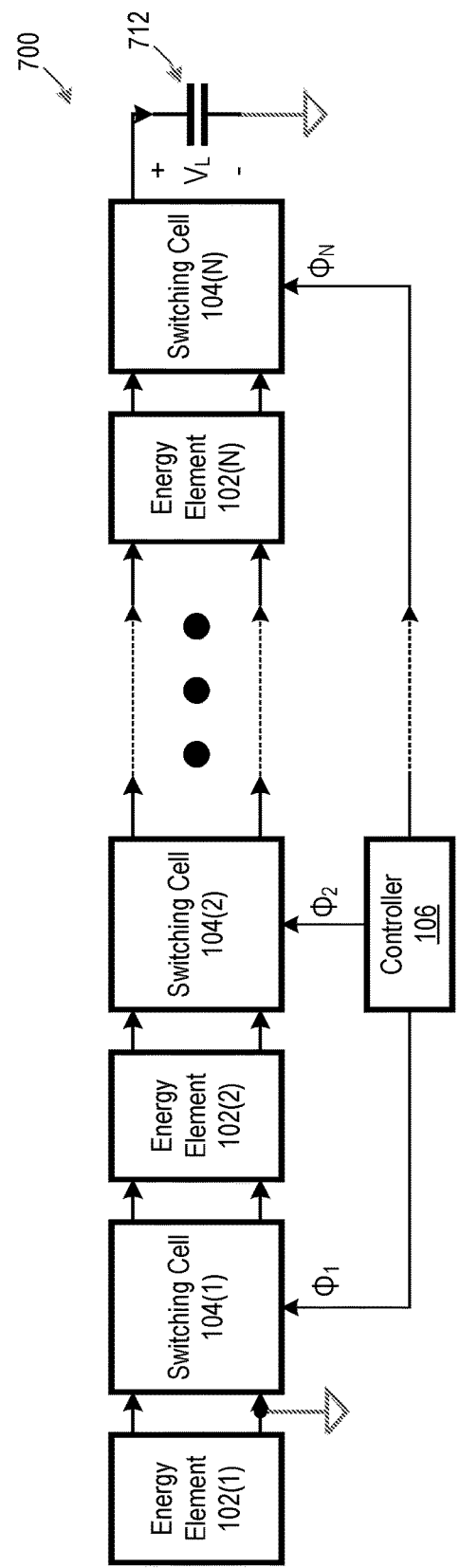
FIG. 7 is a block diagram of an embodiment of the FIG. 1 sequential electrical driving circuit that is configured to drive a capacitive electrical load.

With reference again to FIG. 1, each switching cell 104 is electrically coupled to a respective energy element 102. Specifically, switching cell 104(1) is electrically coupled to energy element 102(1), switching cell 104(2) is electrically coupled to energy element 102(2), and so on. The last switching cell 104, e.g. switching cell 104(N), is electrically coupled to an electrical load 112, as well as to its respective energy element 102(N). Electrical load 112 need not be part of sequential electrical driving circuit 100. While electrical load 112 is depicted as a single element for illustrative clarity, electrical load 112 may include multiple elements without departing from the scope hereof. Electrical load 112 may be a capacitive load, a resistive load, and/or an inductive load. For example, FIG. 7 is a block diagram of a sequential electrical driving circuit 700, which is an embodiment of sequential electrical driving circuit 100 where load 112 is embodied by a capacitive load 712. While capacitive load 712 is illustrated as being purely capacitive, capacitive load 712 could further include a resistive component and/or an inductive component without departing from the scope hereof.

Referring again to FIG. 1, controller 106 is configured to generate a respective control signal $\phi$ for each switching cell 104 to individually control the switching cell 104. Specifically, controller 106 is configured to generate control signal $\phi_1$ for individually controlling switching cell 104(1), control signal $\phi_2$ for individually controlling switching cell 104(2), and so on. While controller 106 is illustrated as being a single element, controller 106 could include multiple elements in one location or multiple elements distributed among two or more locations. Additionally, controller 106 need not be separate from other elements of sequential electrical driving circuit 100. For example, in particular embodiments, at least some portions of controller 106 are incorporated within switching cells 104.

Controller 106 is configured to generate control signals $\phi$ to cause energy elements 102 to be electrically coupled in a plurality of different topologies to drive electrical load 112 with different voltages, as discussed below. Controller 106 includes, for example, analog electronic circuitry (not shown) and/or digital electronic circuitry (not shown). For instance, in certain embodiments, controller 106 includes a processing device and a memory device, where the processing device is configured to execute instructions in the form of software and/or firmware that are stored in the memory device, to generate control signals $\phi$. Controller 106 optionally further includes interface circuitry, such as level-shifting circuitry, to convert internally generated control signals to a form that is compatible with switching cells 104.

Figure 8:
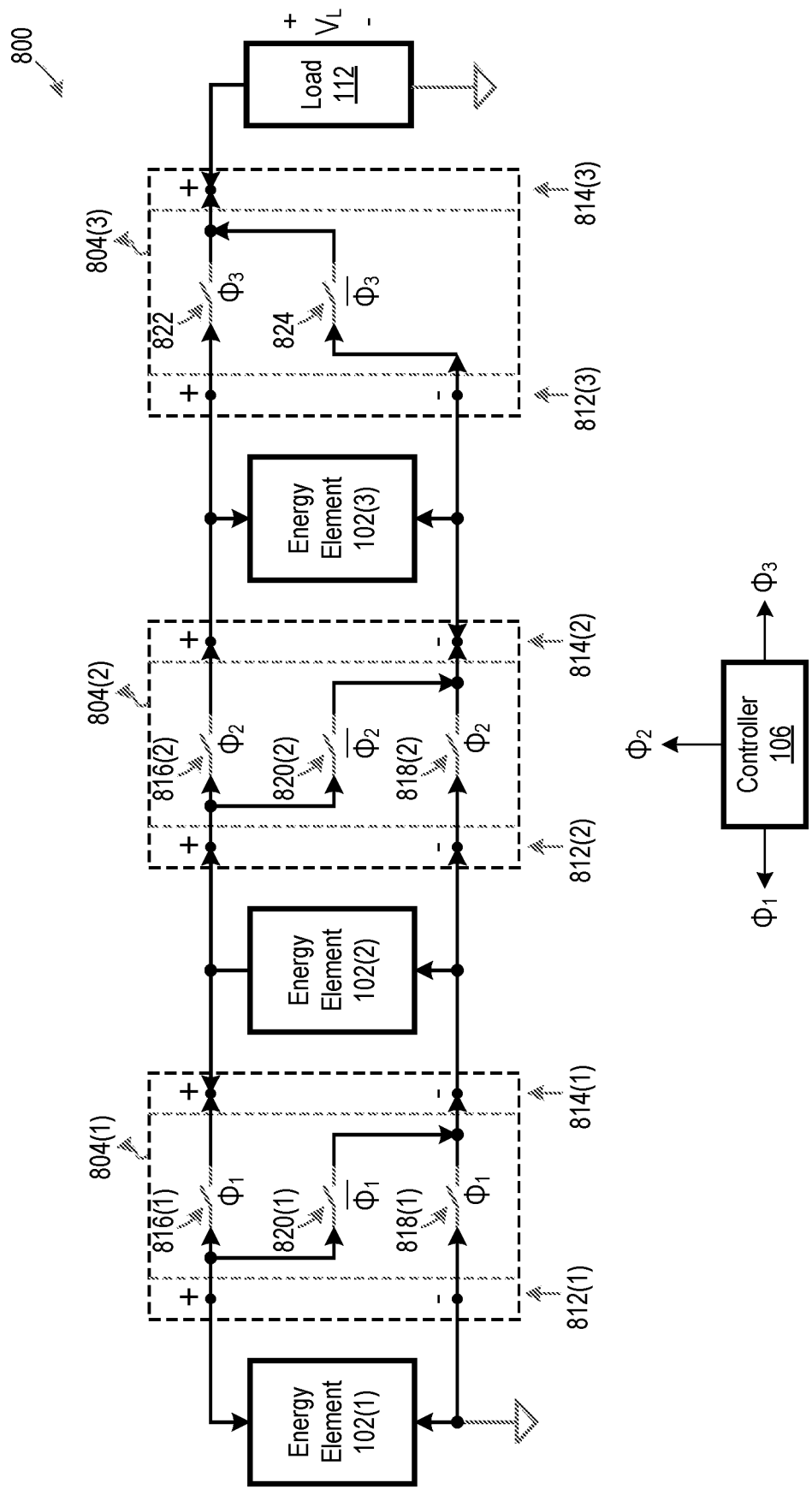
FIG. 8 is a block diagram of an embodiment of the FIG. 1 sequential electrical driving circuit including three switching cells.

FIG. 8 is a block diagram of a sequential electrical driving circuit 800, which is an embodiment of sequential electrical driving circuit 100 where N is equal to three and each switching cell 104 is embodied by a switching cell 804. Sequential electrical driving circuit 800 could be modified such that N is a different integer, as long as N is greater than one.

Each switching cell 804 includes an input port 812 and an output port 814. The input port 812 is electrically coupled to a respective energy element 102. Specifically, input port 812(1) is electrically coupled to energy element 102(1), input port 812(2) is electrically coupled to energy element 102(2), and input port 812(3) is electrically coupled to energy element 102(3). The output ports 814 of switching cells 804(1) and 804(2) are electrically coupled to respective adjacent switching cells 804. In particular, output port 814(1) is electrically coupled to switching cell 804(2), and output port 814(2) is electrically coupled to switching cell 804(3). However, the output port 814 of the last switching cell, i.e. output port 814(3) of switching cell 804(3), is electrically coupled to electrical load 112, instead of to an adjacent switching cell 804.

Each of switching cells 804(1) and 804(2) includes a parallel switching device 816, a parallel switching device 818, and a series switching device 820. In each of switching cells 804(1) and 804(2), (a) parallel switching device 816 is electrically coupled between a positive node (+) of input port 812 and a positive node (+) of output port 814, (b) parallel switching device 818 is electrically coupled between a negative node (−) of input port 812 and a negative node (−) of output port 814, and series switching device 820 is electrically coupled between the positive node (+) of input port 812 and negative node (−) of output port 814.

In each of switching cells 804(1) and 804(2), parallel switching devices 816 and 818 operate in their respective on-states or conductive-states when the control signal $\phi$ for the switching cell is asserted, and parallel switching devices 816 and 818 operate in their respective off-states or non-conductive-states when the control signal $\phi$ for the switching cell is de-asserted. For example, parallel switching device 818(2) operates in its on-state when control signal $\phi_2$ is asserted, and parallel switching device 818(2) operates in its off-state when control signal $\phi_2$ is de-asserted. Conversely, in each of switching cells 804(1) and 804(2), series switching device 820 operates in its on-state or conductive state when the control signal $\phi$ for the switching cell is de-asserted, and series switching device 820 operates in its off-state or non-conductive-state when the control signal $\phi$ for the switching cell is asserted. For example, series switching device 820(2) operates in its on-state when control signal $\phi_2$ is de-asserted, and series switching device 820(2) operates in its off-state when control signal $\phi_2$ is asserted.

Last switching cell 804(3) includes (a) a switching device 822 electrically coupled between a positive node (+) of input port 812(3) and a positive node (+) of output port 814(3), and (b) a switching device 824 electrically coupled between a negative node (−) of input port 812(3) and the positive node (+) of output port 814(3). Switching device 822 operates in its on-state or conductive state when control signal $\phi_3$ is asserted, and switching device 822 operates in its off-state or non-conductive state when control signal $\phi_3$ is de-asserted. Switching device 824 operates in its on-state or conductive state when control signal $\phi_3$ is de-asserted, and switching device 824 operates in its off-state or non-conductive state when control signal $\phi_3$ is asserted. In certain embodiments of sequential electrical driving circuit 800 where N is greater than three, (a) each switching cell 804 other than switching circuit 804(N) is configured like switching cells 804(1) and 804(2) of FIG. 8, and (b) last switching cell 804(N) is configured like switching cell 804(3) of FIG. 8.

Switching cells 804 may include additional circuitry without departing from the scope hereof. For example, in some embodiments, switching cells 804 include circuitry (not shown) for converting control signals, such as from controller 106, to a form suitable for driving the switching devices of the switching cells. Additionally, switching cells 804 may be modified so that their constituent switching devices respond differently to control signals $\phi$ than as discussed above. For example, switching cells 804(3) may be modified such that switching device 822 operates in its on-state when control signal $\phi_3$ is de-asserted, and switching device 824 operates in its on-state when control signal $\phi_3$ is asserted.

Figure 9:
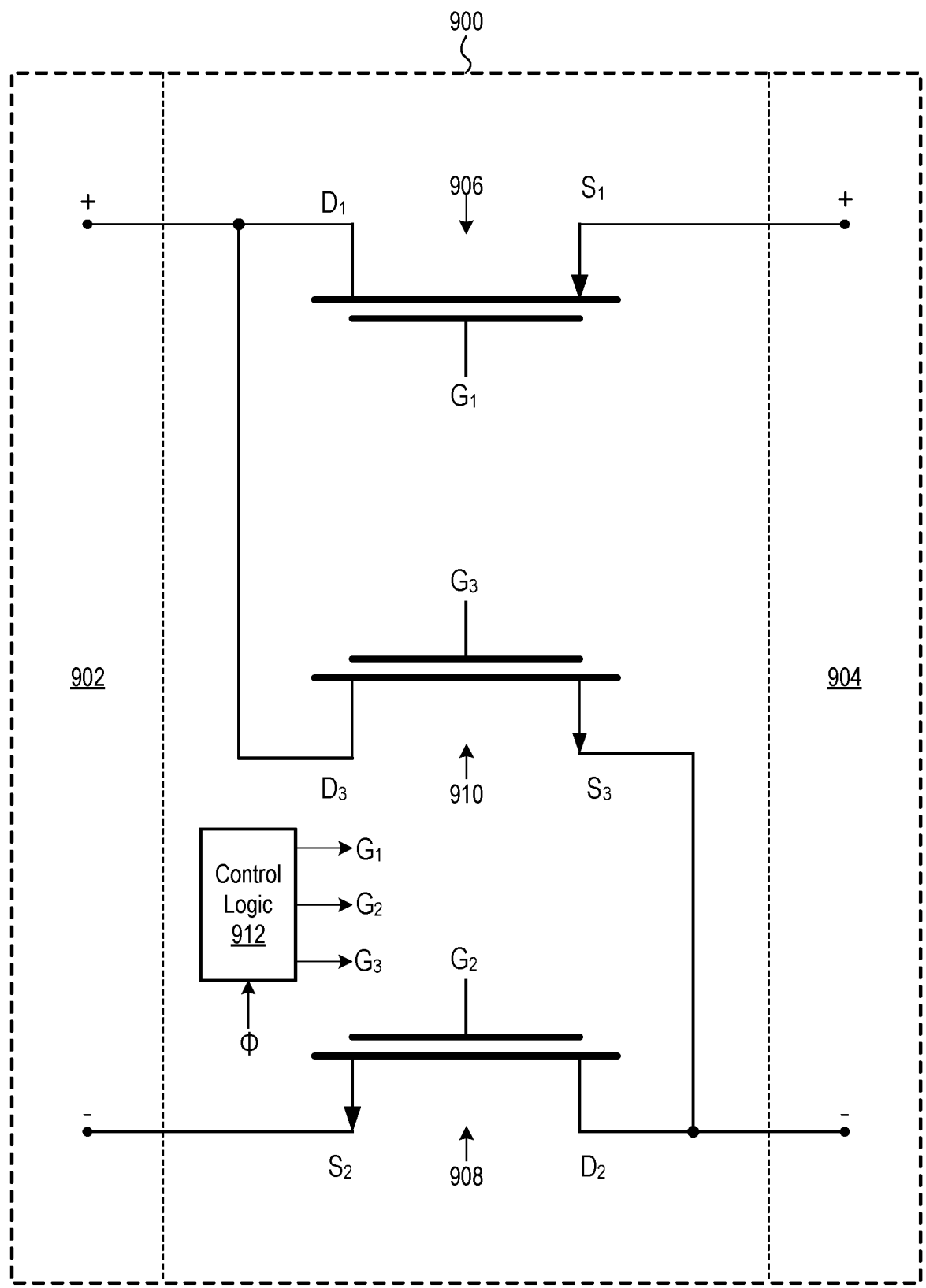
FIG. 9 is a schematic diagram of a switching cell, according to an embodiment.

In some embodiments, the constituent switching devices of switching cells 804 are embodied by transistors, relays, and/or other devices capable of switching between conductive and non-conductive states in response to a control signal. For example, FIG. 9 is a schematic diagram of a switching cell 900, which is one possible embodiment of each of switching cells 804(1) and 804(2). Switching cell 900 includes an input port 902, an output port 904, a transistor 906, a transistor 908, a transistor 910, and control logic 912. Input port 902 and output port 904 are embodiments of input port 812 and output port 814, respectively. Transistor 906 is an embodiment of parallel switching device 816 and includes (a) a drain $D_1$ electrically coupled to a positive node (+) of input port 902, (b) a source $S_1$ electrically coupled to a positive node (+) of output port 904, and (c) a gate $G_1$ electrically coupled to control logic 912. Transistor 908 is an embodiment of parallel switching device 818 and includes (a) a drain $D_2$ electrically coupled to a negative node (−) of output port 904, (b) a source $S_2$ electrically coupled to a negative node (−) of input port 902, and (c) a gate $G_2$ electrically coupled to control logic 912. Transistor 910 is an embodiment of series switching device 820 and includes (a) a drain $D_3$ electrically coupled to the positive node (+) of input port 902, (b) a source $S_3$ electrically coupled to the negative node (−) of output port 904, and (c) a gate $G_3$ electrically coupled to control logic 912.

Control logic 912 is configured to drive the gates of transistors 906, 908, and 910 according to a control signal ϕ for switching cell 900. For example, in some embodiments, control logic 912 is configured to drive the gates of transistors 906, 908, and 910 such that (a) transistors 906 and 908 are in their respective on-states when control signal ϕ is asserted, and (b) transistor 910 is in its on-state when control signal ϕ is de-asserted. As another example, in some embodiments, control logic 912 is configured to drive the gates of transistors 906, 908, and 910 such that (a) transistors 906 and 908 are in their respective on-states when control signal ϕ is de-asserted, and (b) transistor 910 is in its on-state when control signal ϕ is asserted. Although transistors 906, 908, and 910 are depicted as being a p-channel MOSFET, an n-channel MOSFET, and an n-channel MOSFET, respectively, one or more of transistors 906, 908, and/or 910 could be replaced with a different type of transistor, such as a different type of MOSFET, a bipolar junction transistor (BJT), or an IGBT, with appropriate changes to control logic 912.

Referring again to FIG. 8, in some embodiments, controller 106 is configured to generate control signals ϕ to control switching cells 804 to have a time sequence of configurations and thereby drive electrical load 112 with a time sequence of different voltages $V_L$. In particular configurations, controller 106 is configured to cause each switching cell 804 to operate in a parallel operating state or a series operating state, and controller 106 is configured to change voltage $V_L$ by causing one or more switching cells 804 to change between its parallel operating state and its series operating state. A switching cell 804 [other than last switching cell 804(N)] operates in its parallel operating state when (a) parallel switching devices 816 and 818 operate in their respective on-states and (b) series switching device 820 simultaneously operates in its off-state. A switching cell 804 [other than last switching cell 804(N)] operates in its series operating state when (a) parallel switching devices 816 and 818 operate in their respective off-states and (b) series switching device 820 simultaneously operates in its on-state. The topology of switching cells 804(1) and 804(2) could vary as long as the switching cells are capable of operating in both a parallel operating state and a series operating state.

Last switching cell 804(N), e.g. switching cell 804(3) in FIG. 8, has at least a zero-voltage operating state and a non-zero-voltage operating state. Last switching cell 804(N) operates in its a zero-voltage operating state when switching device 822 operates in its off-state and switching device 824 simultaneously operates in its on-state. Last switching cell 804(N) operates in its a non-zero-voltage operating state when switching device 822 operates in its on-state and switching device 824 simultaneously operates in its off-state. The topology of last switching cell 804(N) could vary as long as the switching cell is capable of operating in both a zero-voltage operating state and a non-zero-voltage operating state.

Figure 10:
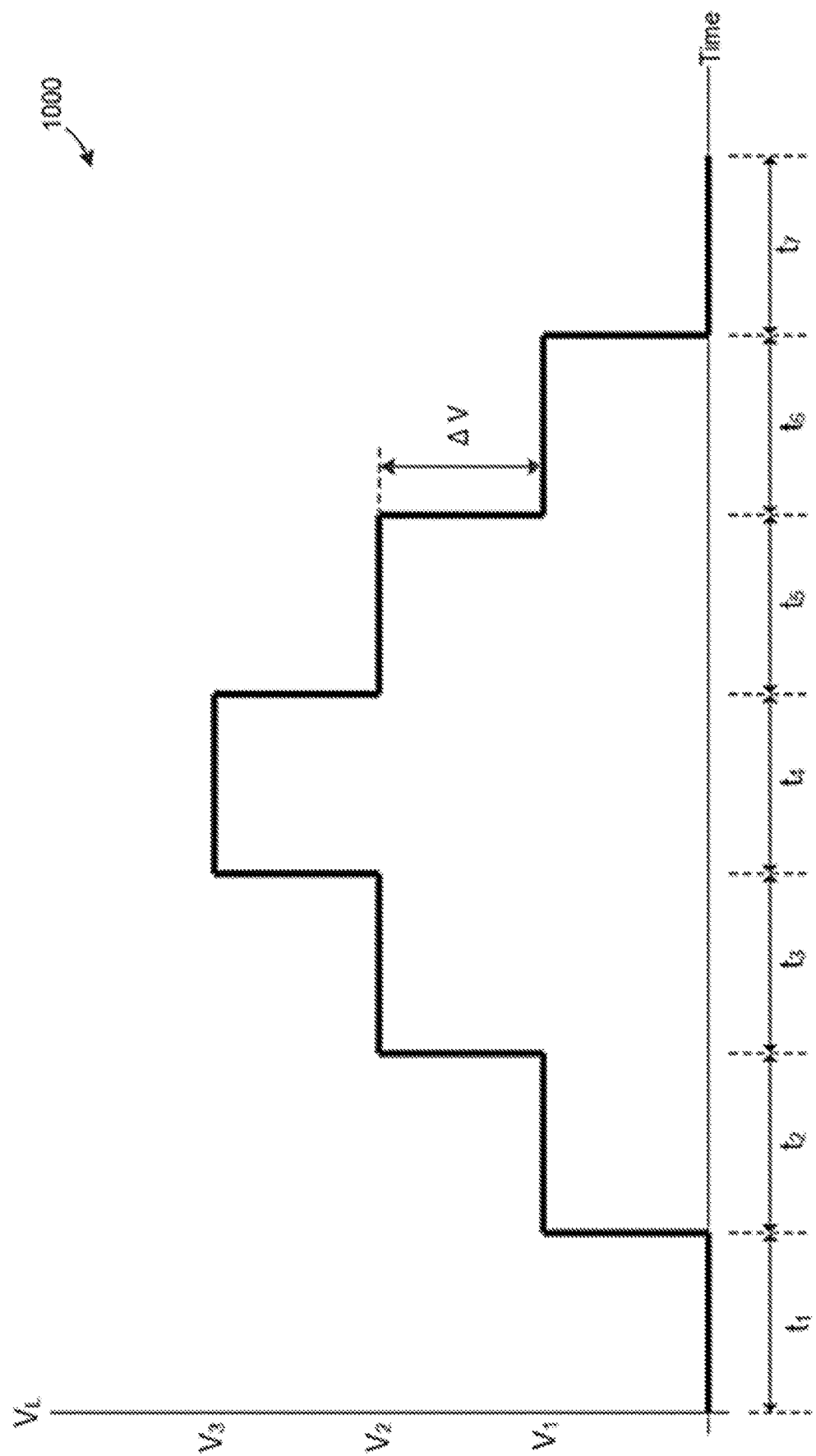
FIG. 10 is a graph illustrating one example of a controller controlling switching cells to drive an electrical load with a time sequence of different voltages, according to an embodiment.

FIG. 10 is a graph 1000 illustrating one example of controller 106 controlling switching cells 804 to drive electrical load 112 with a time sequence of different voltages $V_L$. It should be appreciated, though, that controller 106 could be configured to control switching cells 804 to drive electrical load 112 with a different time sequence of voltages $V_L$ without departing from the scope hereof.

Figure 11:
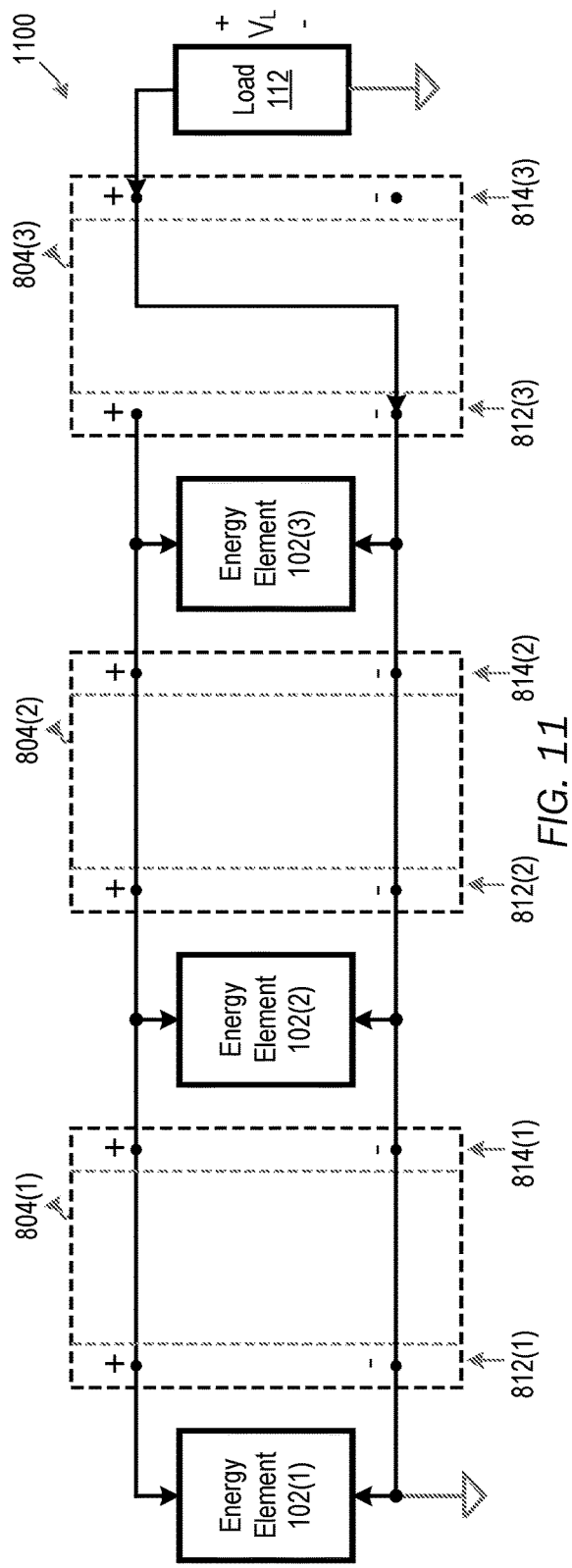
FIG. 11 is a schematic diagram illustrating a topology of energy elements during certain time periods of the FIG. 10 graph.

The vertical axis of graph 1000 represents voltage $V_L$ across electrical load 112, and the horizontal axis of graph 1000 represents time. During time period $t_1$, switching cell 804(3) operates in its zero-voltage operating state such that magnitude of voltage $V_L$ is zero. FIG. 11 is a schematic diagram illustrating a topology of energy elements 102 during time period $t_1$. As can be determined from FIG. 11, each of switching cells 804(1) and 804(2) operates in its respective parallel operating state during time period $t_1$, such that energy elements 102 are electrically coupled in parallel. Nevertheless, magnitude of voltage $V_L$ is zero during time period $t_1$ because switching cell 804(3) operates in its zero-voltage operating state.

Figure 12:
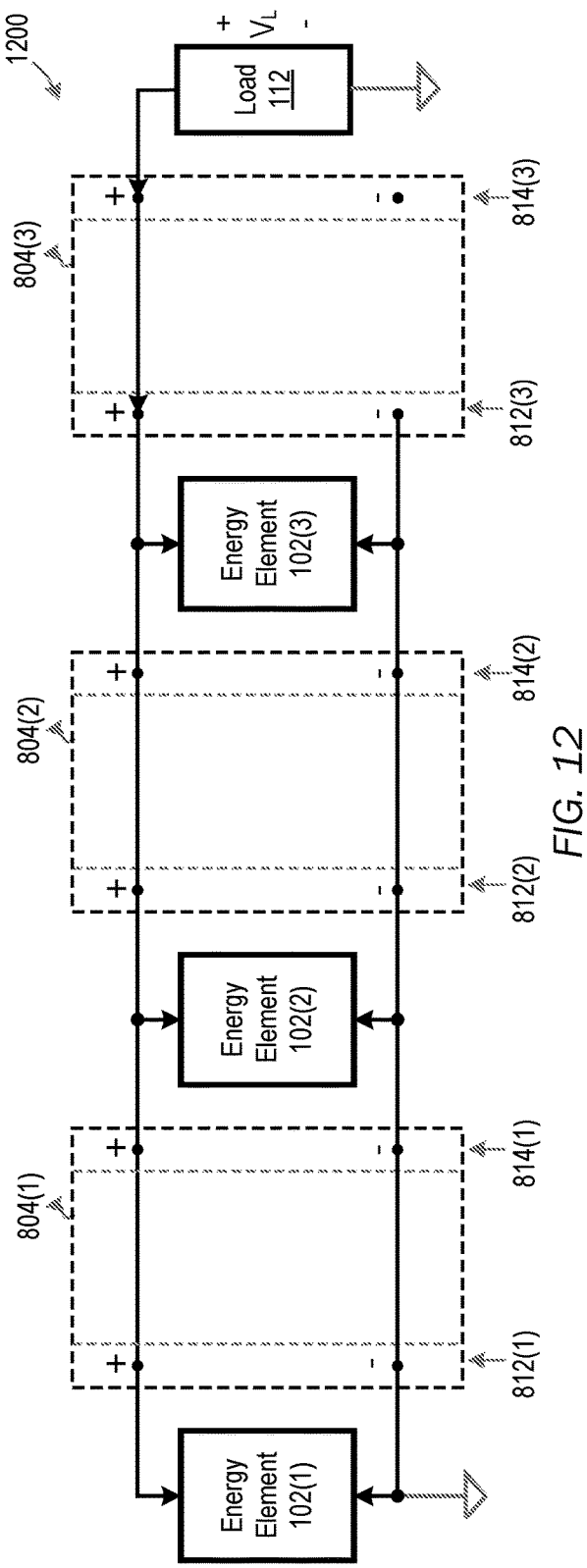
FIG. 12 is a schematic diagram illustrating a topology of energy elements during other time periods of the FIG. 10 graph.

During time period $t_2$, each of switching cells 804(1) and 804(2) operates in its parallel operating state, and switching cell 804(3) operates in its non-zero-voltage operating state. Consequentially, magnitude of voltage $V_L$ is $V_1$, where voltage $V_1$ is magnitude of voltage across each energy element 102. FIG. 12 is a schematic diagram illustrating a topology of energy elements 102 during time period $t_2$. As evident from FIG. 12, all energy elements 102 are electrically coupled in parallel during time period $t_2$.

Figure 13:
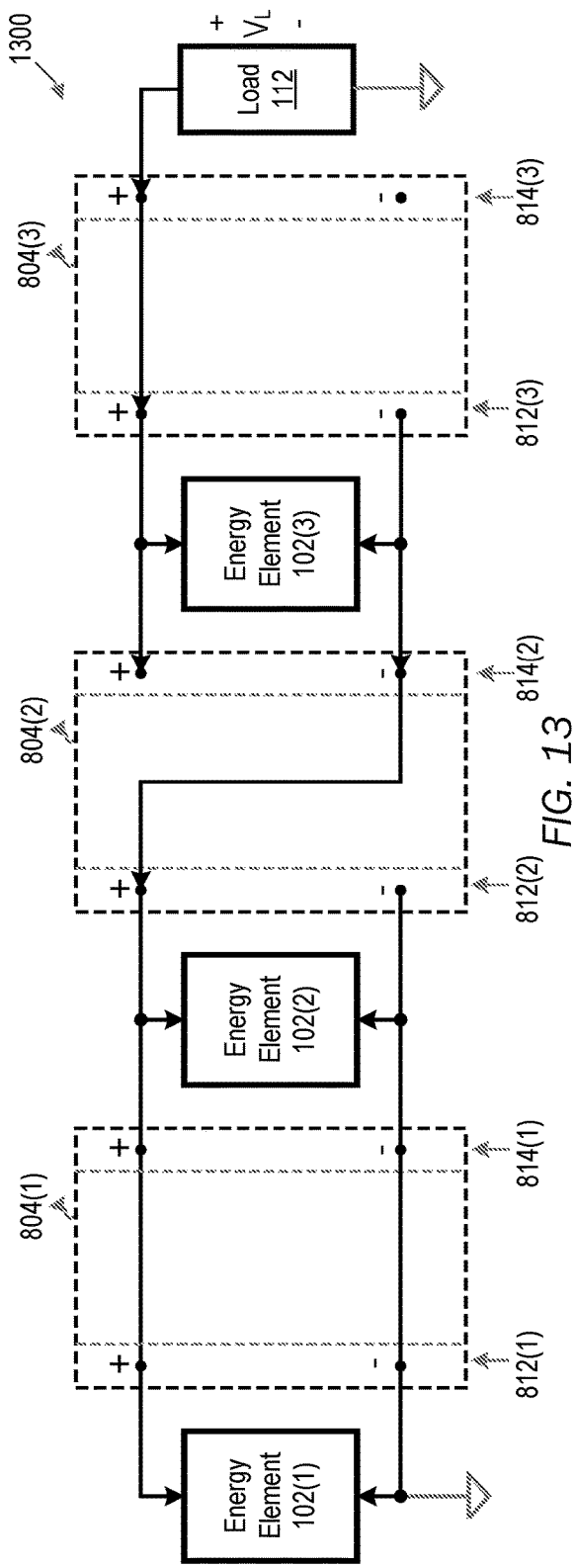
FIG. 13 is a schematic diagram illustrating a topology of energy elements during other periods of the FIG. 10 graph.

During time period $t_3$, (a) switching cell 804(1) operates in its parallel operating state, (b) switching cell 804(2) operates in its series operating state, and (c) switching cell 804(3) operates in its non-zero-voltage operating state. Consequentially, magnitude of voltage $V_L$ is $V_2$. In some embodiments, voltage $V_2$ is approximately, e.g. within plus or minus ten percent, twice a magnitude of voltage across any one energy element 102. FIG. 13 is a schematic diagram illustrating a topology of energy elements 102 during time period $t_3$. As evident from FIG. 13, energy element 102(3) is electrically coupled in series with a parallel combination of energy elements 102(1) and 102(2) during time period $t_3$. Accordingly, energy elements 102 are electrically coupled in a series-parallel combination during time period $t_3$.

Figure 14:
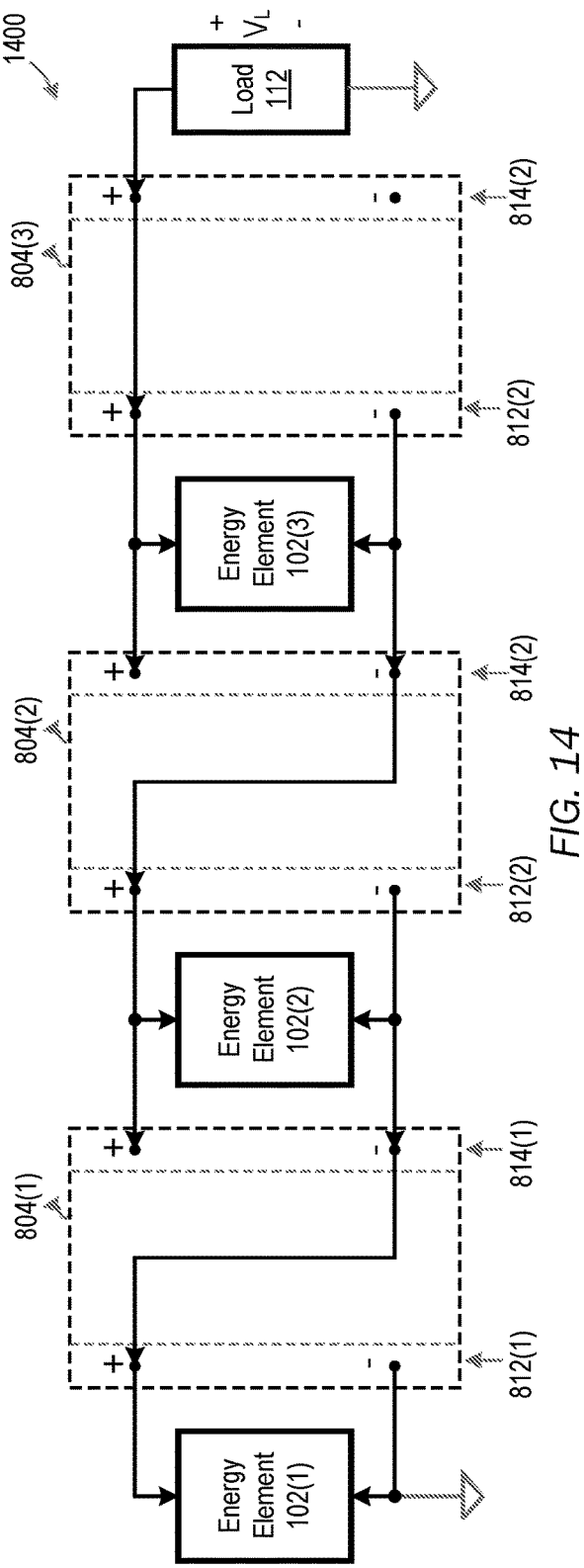
FIG. 14 is a schematic diagram illustrating a topology of energy elements during another time period of the FIG. 10 graph.

During time period $t_4$, each of switching cells 804(1) and 804(2) operates in its series operating state, and switching cell 804(3) operates in its non-zero-voltage operating state. Consequentially, magnitude of voltage $V_L$ is $V_3$. In some embodiments, voltage $V_3$ is approximately, e.g. within plus or minus ten percent, three-times a magnitude of voltage across any one energy element 102. FIG. 14 is a schematic diagram illustrating a topology of energy elements 102 during time period $t_4$. As evident from FIG. 14, all energy element 102 are electrically coupled in series during time period $t_4$.

During time period $t_5$, (a) switching cell 804(1) operates in its parallel operating state, (b) switching cell 804(2) operates in its series operating state, and (c) switching cell 804(3) operates in its non-zero-voltage operating state. Consequentially, magnitude of voltage $V_L$ is $V_2$, and energy elements 102 have the topology of FIG. 13, during time period $t_5$.

During time period $t_6$, each of switching cells 804(1) and 804(2) operates in its parallel operating state, and switching cell 804(3) operates in its non-zero-voltage operating state. Consequentially, magnitude of voltage $V_L$ is $V_1$, and energy elements 102 have the topology of FIG. 12, during time period $t_6$.

During time period $t_7$, each of switching cells 804(1) and 804(2) operates in its parallel operating state, and switching cell 804(3) operates in its zero-voltage operating state. Consequentially, magnitude of voltage $V_L$ is zero, and energy elements 102 have the topology of FIG. 11, during time period $t_7$.

Accordingly, controller 106 controls switching cells 804 to drive electrical load 112 with a time sequence of different voltages in the example of FIG. 10, such that voltage $V_L$ across electrical load 112 has an AC component with multiple steps. In some embodiments, a magnitude of a voltage step between sequential voltages $V_L$ is $\Delta V$, where $\Delta V$ is approximately, e.g. within plus or minus ten percent, magnitude of voltage across any one energy element 102.

The new sequential electrical driving circuits disclosed herein can achieve significant advantages that cannot be realized by conventional electrical driving circuits. For example, $P_{HS}$ for sequential electrical driving circuit 100 is approximately as follows, where electrical load 112 is embodied by a capacitive load having a capacitance $C_x$, $V_{dr}$ is magnitude of total voltage switched across electrical load 112, and $f_{sw}$ is switching frequency:

$$P_{HS} = \frac{C_x * V_{dr}^2 * f_{sw}}{N} \quad \text{(EQN. 2)}$$

As evident from EQN. 2, $P_{HS}$ of sequential electrical driving circuit 100 is reduced by a factor of N compared to a conventional hard charging electrical driving circuit. Consequently, sequential electrical driving circuit 100 may achieve a smaller $P_{HS}$ than a conventional hard charging electrical driving circuit, especially when N is large.

Furthermore, switching devices of each switching cell 104 need only be capable of withstanding a voltage of an associated energy element 102, thereby promoting low cost and potentially enabling use of high performance, e.g. low on-resistance, switching devices. Switching devices of conventional hard charging driving circuits, in contrast, typically must capable of withstanding an entire voltage switched across a load.

Moreover, certain embodiments of the sequential electrical driving circuits disclosed herein are capable of driving a load with an AC component having multiple voltage steps, such as discussed above with respect to FIG. 10. Conventional hard charging driving circuits, however, cannot realize such multi-step AC component.

Figure 15:
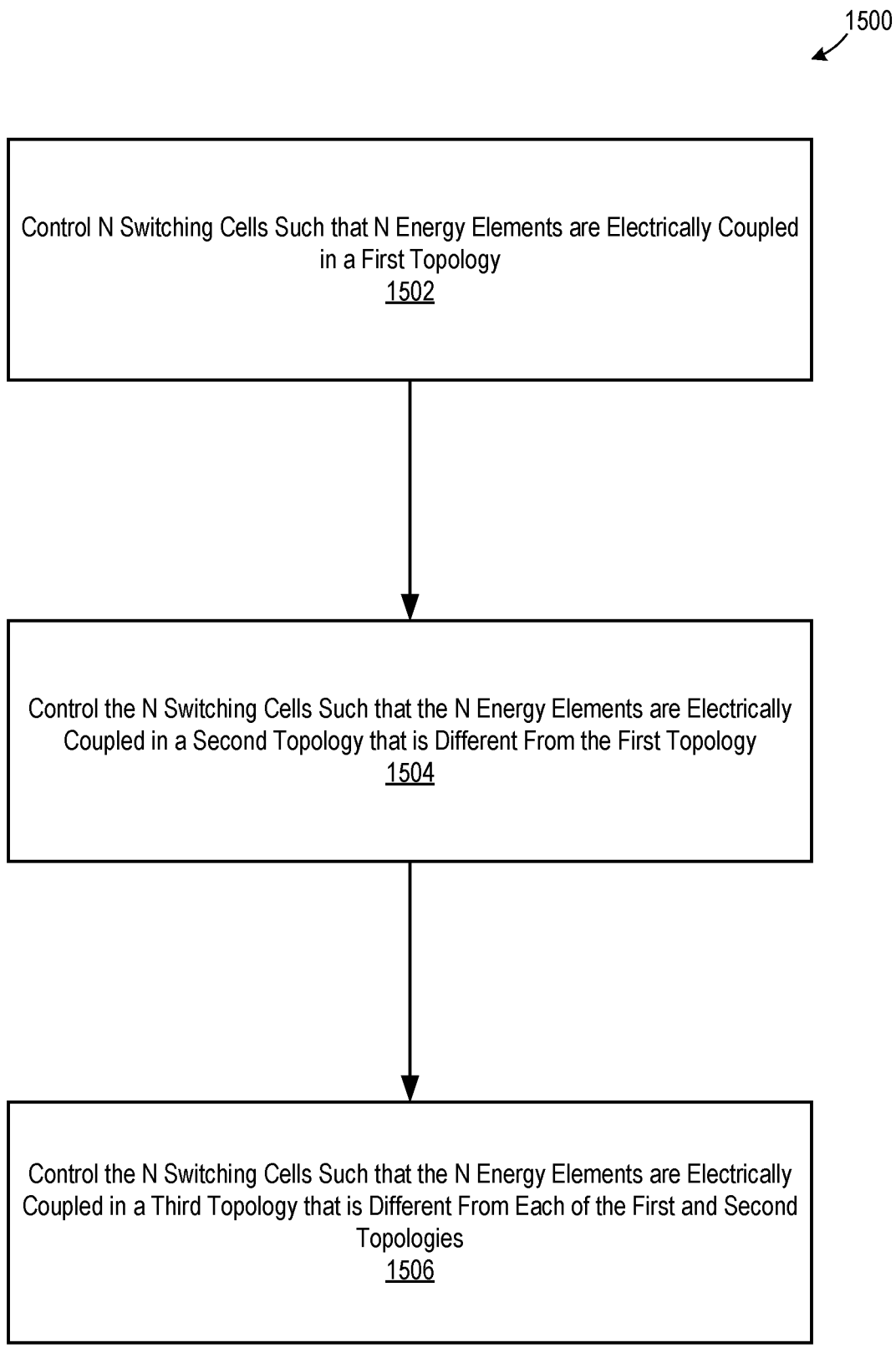
FIG. 15 is a flow chart illustrating a method for sequentially driving an electrical load, according to an embodiment.

FIG. 15 is a block diagram illustrating a method 1500 for sequentially driving an electrical load. In a block 1502 of method 1500, N switching cells electrically coupled to N energy elements are controlled such that the N energy elements are electrically coupled to the electrical load in a first topology to drive the electrical load with a first voltage, where N is an integer greater than one. In one example of block 1502, controller 106 controls switching cells 804(1)-804(3) such that energy elements 102 are electrically coupled to electrical load 112 in the topology of FIG. 12, to drive electrical load 112 with voltage magnitude $V_1$ (FIG. 10).

In a block 1504 of method 1500, the N switching cells are controlled such that the N energy elements are electrically coupled to the electrical load in a second topology that is different from the first topology, to drive the electrical load with a second voltage that is different from the first voltage. In one example of block 1504, controller 106 controls switching cells 804(1)-804(3) such that energy elements 102 are electrically coupled to electrical load 112 in the topology of FIG. 13, to drive electrical load 112 with voltage magnitude $V_2$ (FIG. 10).

In a block 1506 of method 1500, the N switching cells are controlled such that the N energy elements are electrically coupled to the electrical load in a third topology that is different from each of the first topology and the second topology, to drive the electrical load with a third voltage that is different from each of the first voltage and the second voltage. In one example of block 1506, controller 106 controls switching cells 804(1)-804(3) such that energy elements 102 are electrically coupled to electrical load 112 in the topology of FIG. 14, to drive electrical load 112 with voltage magnitude $V_3$ (FIG. 10).

Figure 16:
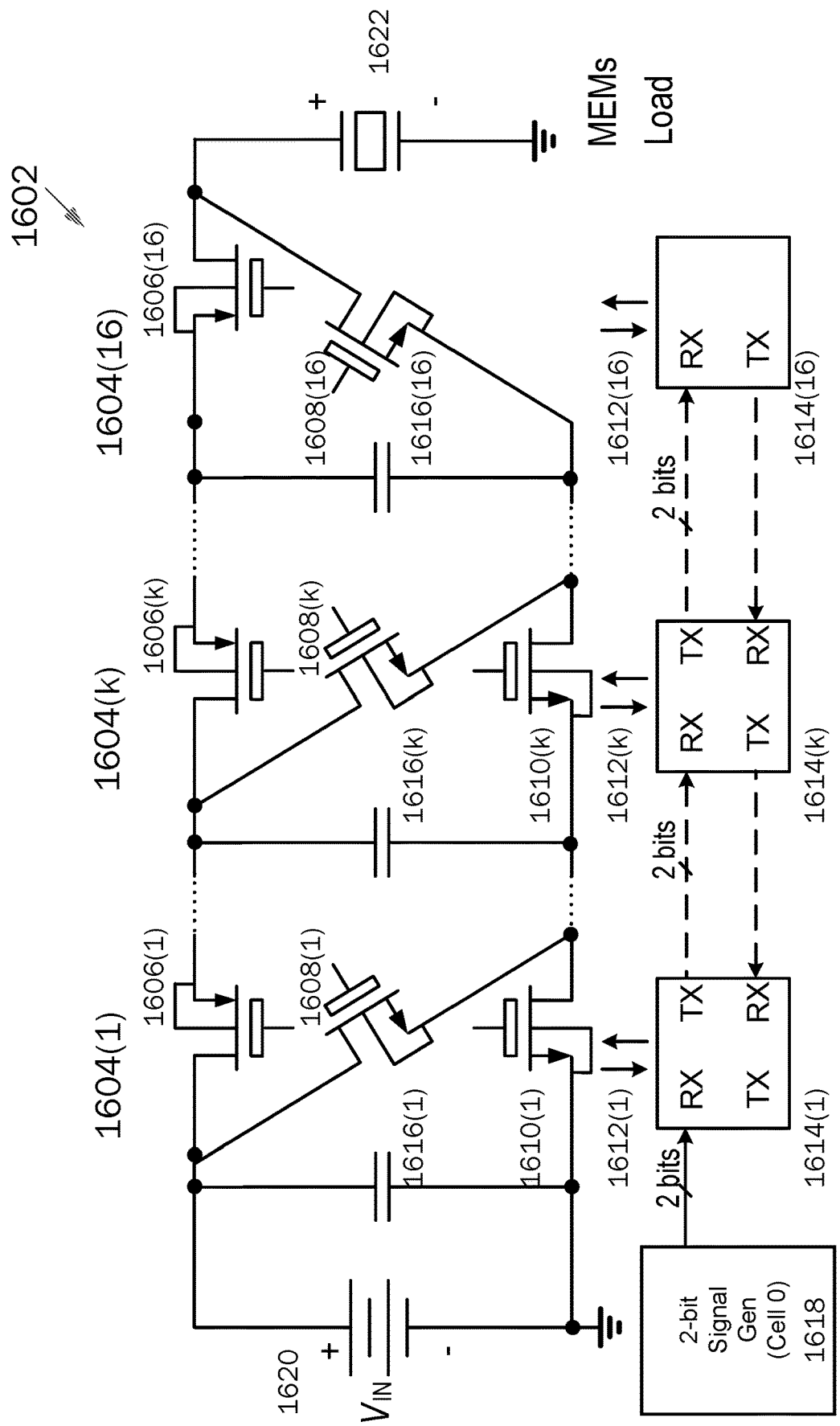
FIG. 16 is a schematic diagram illustrating a distributed control topology of energy elements according to an embodiment.

FIG. 16 shows a schematic of a distributed control topology with a series of power stages 1604. Cell 1604(1) is connected to voltage input 1620 and the last cell 1604(16) is connected to the output 1622. The cells in between are 1604(k) where k is an integer from 2 to 15 for a total of 16 cells in this example. Any integer greater than one may be used for the number of cells, without departing from the scope, i.e. there could be more or fewer than 16 cells. Each cell contains an upper device 1606, a lower device 1610 and a diagonal device 1608. In this case these elements are represented by MOSFETS but any suitable switching device may be used. Examples of switches that may be used are, but are not limited to: MOSFETs, JFETs, BJTs, or IGBTs. In addition, each cell includes an energy storage device 1616. In this case 1616 is represented by a capacitor, however in other embodiments it could be another type of energy storage device, such as battery, or fuel cell. Also contained in each cell is a control module, which operates as a Finite State Machine (FSM) 1614. Each FSM module changes its state from one to another based on input signals. In the distributed control topology shown in FIG. 16, the individual cells' FSM control elements are daisy chained together receiving control signals from and passing their own control signals to the adjacent cells' FSMs. A 2 bit signal generator is shown in element 1618 that drives the first FSM element. Each FSM is responsible for controlling the MOSFET gates in the switching cell as well as passing its state to each of the adjacent cells, as shown in 1612 of FIG. 16. The last cell in the daisy chained array of cells drives the load 1622 while the first cell is fed from an input of Vin 1620.

Figure 17:
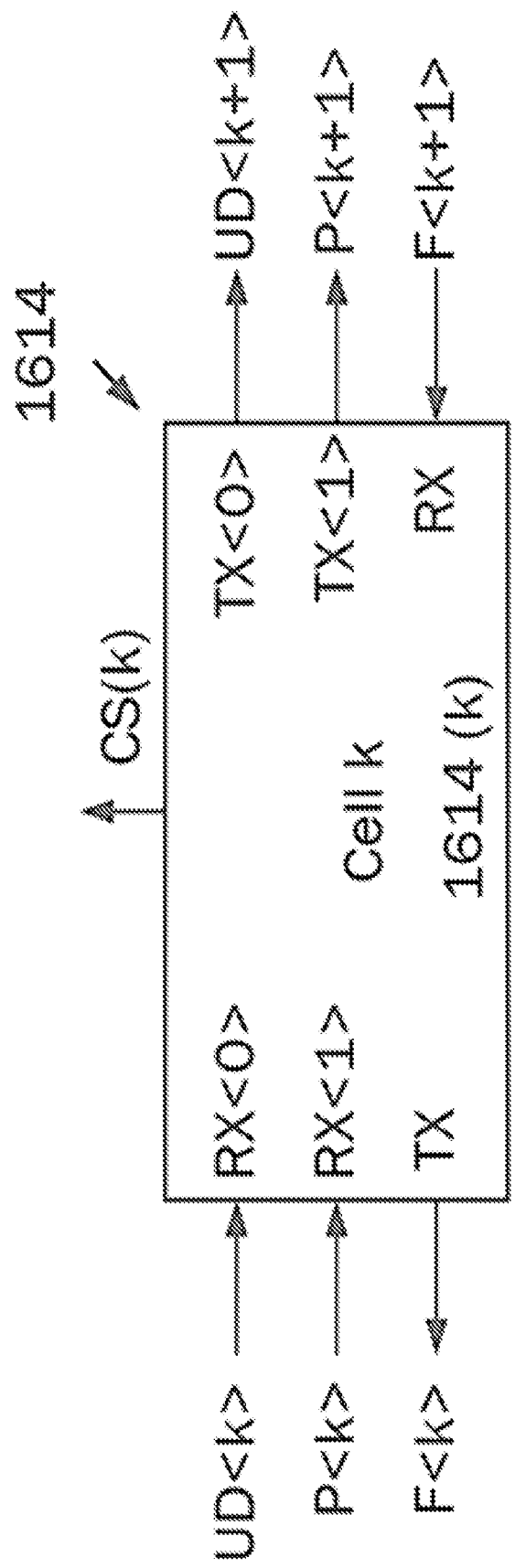
FIG. 17 is a diagram showing a Finite State Machine for use with the distributed control topology of FIG. 16, in embodiments.

In each switching cell, the local FSM 1614 sets the state of the current cell, sends a control signal to next cell, and feeds the state information back to a previous cell. The input and output of each FSM 1614 is shown in FIG. 17. Each FSM receives a 2-bit control signal from the previous cell: UP/DOWN UD (whether the FSM is switching up or down) and pulse P (a clock signal that synchronizes switching). Because a given cell 'k' controls the state of the next cell's capacitor 1616(k+1), each FSM holds information about its current state, CS(k), and the adjacent cells (Flags, F(k) and F(k+1)). The signal CS(k) ultimately controls the gate drives of each switching elements in the cell 'k'. When stepping up a voltage from Vin 1620 to Vout 1622; the cell closest to the load, Cell 16, switches first and then each successive adjacent cell follows in a reverse order (Cell 15 to Cell 1) as long as the UD(k) signal remains 1. From the perspective of arbitrary cell 'k,' if the current state CS<k>=0, i.e., the next cell's capacitor 1616(k+1) is in parallel while the capacitor 1616(k+2) is in series (based on a corresponding feedback from the next cell F<k+1>=1), assuming input UD<k>=1 (stepping up) and pulse P<k> has been triggered, the cell 'k' will assert the series state (CS<k>+=1, where '+' denotes "after transition" state), thus, putting capacitor 1616(*k*+1) in series with the capacitor 1616(*k*). When stepping down, the process is mirrored such that each capacitor recovers a similar fraction of its original voltage starting with cell 1 and working to cell 16. Table I shows the full state transition table including all possible scenarios. In the case of an error or invalid state, the FSM defaults the cell transitioning to the parallel state. The benefit of this approach is that no high-voltage level shifters are needed. This provides scalability to high voltages and affords error correction and fault detection, improving robustness.

Shown in FIGS. 16 and 17, this embodiment uses a scalable distributed 'daisy-chain' control approach to pass signal information along a floating 'stack' of switching cells. Distributing control into local finite state machines (FSMs), eliminates the need for high-voltage level shifters, simplifying off-chip control to a 2-bit clock Up/Down control signal. This makes the architecture extensible to an arbitrary number of cells—even across chip-to chip boundaries. The voltage range is extended to over 300Vpp, using only 5V/20V rated devices with measurements showing approximately a 10 times reduction in power consumption compared to conventional hard-switching drivers.

Table I the State Transferring Table, shows that the state of each signal is latched, so that the output is held until the next P pulse. This will reduce the quiescent power consumption. Latching signals will also make the state signals noise immune such that common mode voltage variation, or noise, will not change the signal state. An example of one possible State Transferring Table is shown below:

TABLE I

State Transferring Table

| P_RX | UD_RX | F_RX | CS | Action | CS_new | P_TX | UD_TX | F_TX |
|---|---|---|---|---|---|---|---|---|
| 1 | 0 | 0 | 0 | Transfer P, stay current state | Latched | 1 | 0 | Latched |
| 1 | 0 | 0 | 1 | Wrong state, switch to parallel | 0 | 1 | 0 | 0 |
| 1 | 0 | 1 | 0 | Transfer P, stay current state | Latched | 1 | 0 | Latched |
| 1 | 0 | 1 | 1 | Step down, transfer UD signal | 0 | 1 | 0 | 0 |
| 1 | 1 | 0 | 0 | Transfer P, stay current state | Latched | Latched | 1 | Latched |
| 1 | 1 | 0 | 1 | Wrong state, switch to parallel | 0 | Latched | Latched | 0 |
| 1 | 1 | 1 | 0 | Step up | 1 | Latched | 1 | 1 |
| 1 | 1 | 1 | 1 | Stay current state | Latched | 1 | Latched | Latched |

In this example the Pulse Signal P is used to trigger the state of the FSM. It is triggered on the edge of P changing from 0 to 1. Up/Down signal UD indicates stepping up, denoted by a value of 1, or stepping down denoted by a value of 0. Stepping up means a cell is converting from a parallel connection to a series connection. Stepping down means a cell is transitioning from a series connection to a parallel connection. The signal CS indicates the Cell Status and is the value 0 when the cell is in parallel with the next stage. That is CS<k>=0, when cell (k) is in parallel with cell (k+1). When CS<k>=1, then cell (k) is in series with cell (k+1). Signal F<k> is fed back from the next stage. F<k+1>=0 when cell (k+1) is in parallel with cell (k+2) and is in series when F<k+1>=1. Cell (k), knowing its own state, only needs to know the state of cell (k+1).

Figure 18:
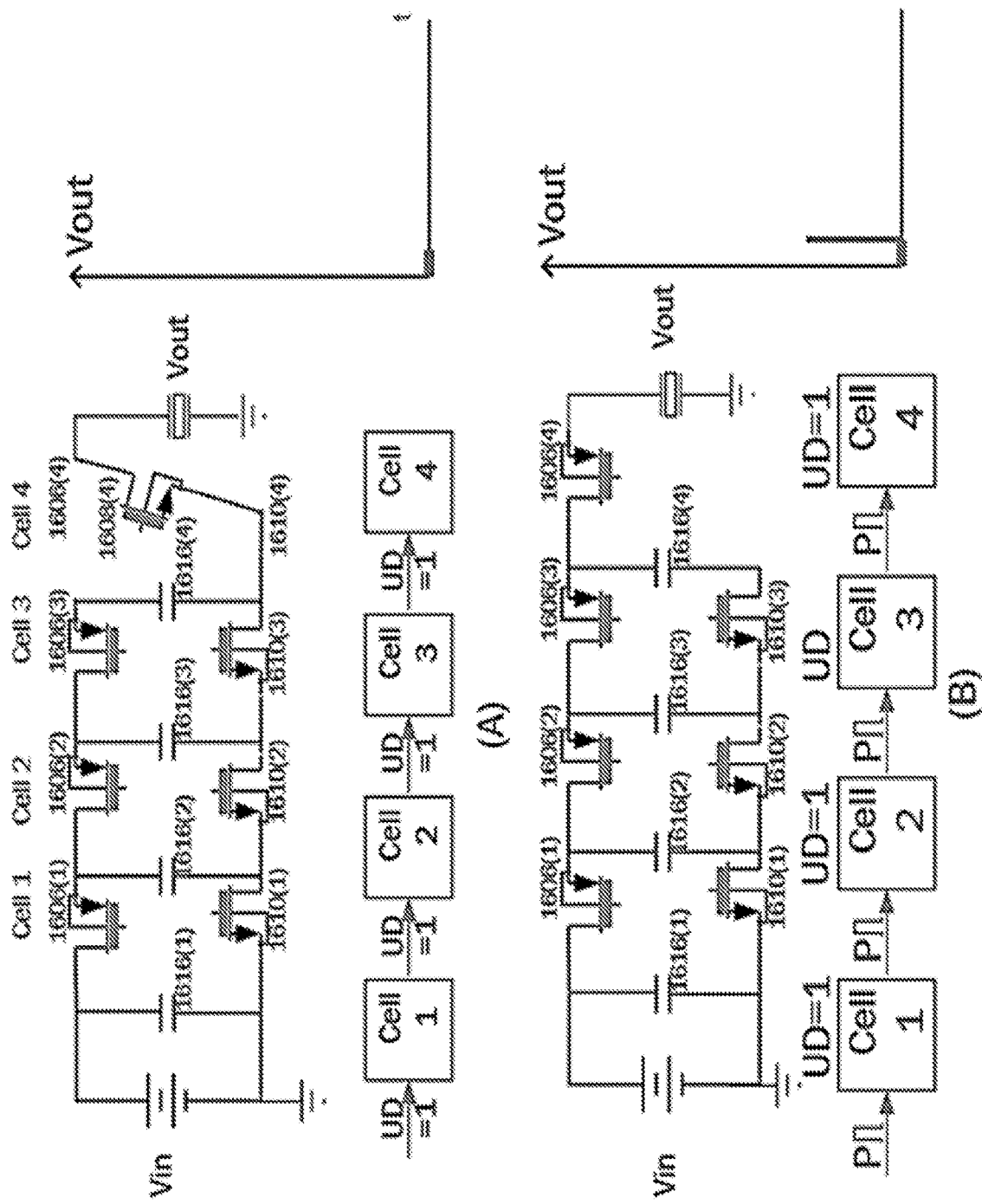
FIG. 18 is a diagram illustrating an initial state of the distributed control topology of FIG. 16, in embodiments.

FIG. 18 shows the first two steps of the stepping up output voltage process by rearranging the cells from a parallel to a series configuration. In the initial step, all the individual cells' capacitors are charged in parallel from the voltage source, $V_{in}$; the load is initially connected to ground. Together with FIGS. 19-22, FIG. 18 represent a four-cell example of the embodiment shown in FIG. 16 switching process, which produces an output voltage, Vout. For clarity of the illustrating example, only the turned ON MOSFETs are visible; the disabled MOSFETs are hidden. FIG. 18 (A) shows the output connected to ground via MOSFET 1608(4) turned on while 1606(4) is turned off (not shown) such that the output Vout consequently is at 0 volts. In the next step, shown in FIG. 18 (B), 1606(4) is turned on such that the resulting output voltage, Vout, is equal to the input voltage, $V_{in}$, that is also across capacitor 1616(4). Note that in this step the last cell, which is adjacent to the output, $V_{out}$, is the first cell switched.

Figure 19:
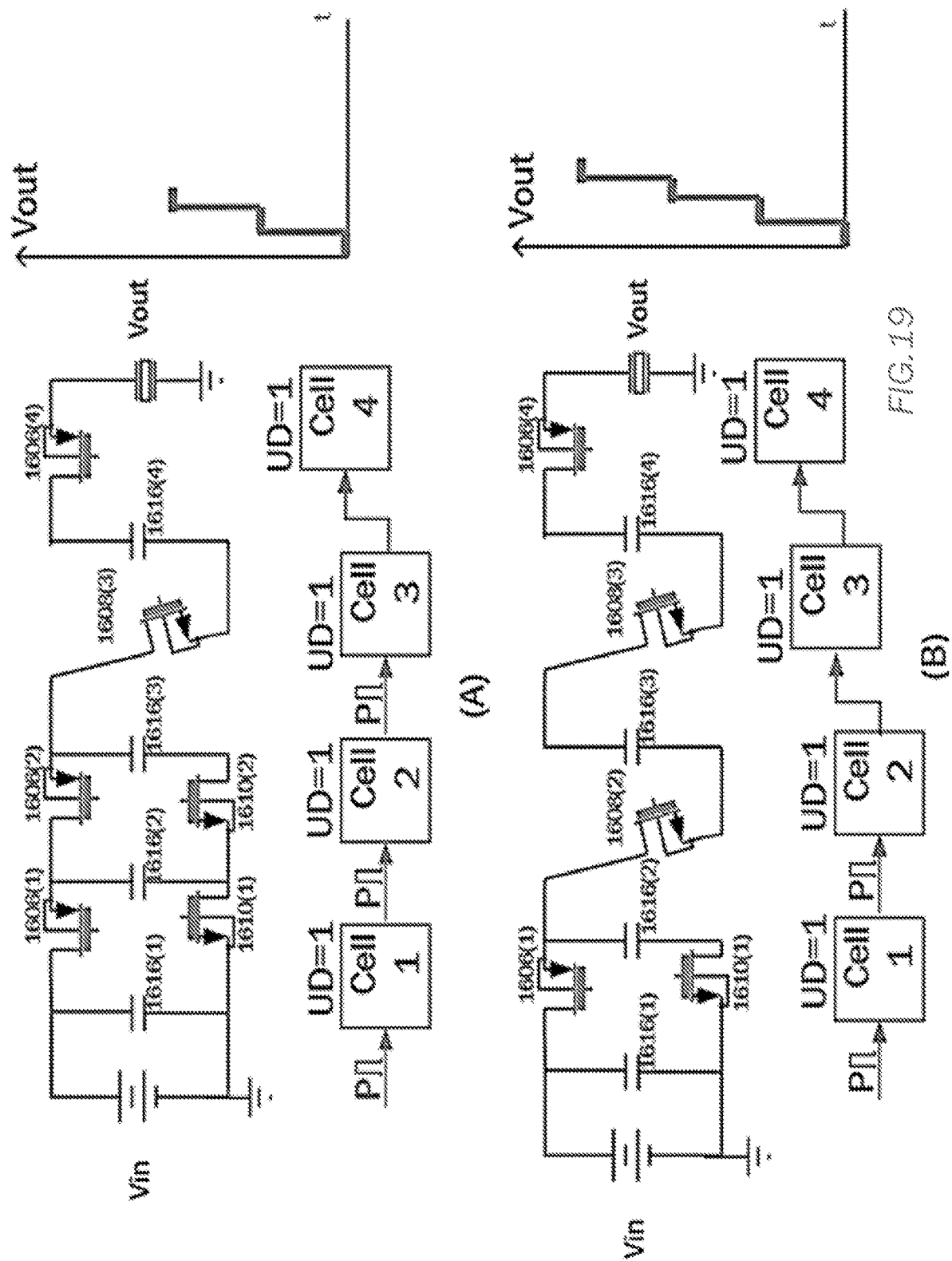
FIG. 19 is a diagram illustrating a step-up state of the distributed control topology of FIG. 16, in embodiments.

FIG. 19 (A) shows the next steps in the stepping up output voltage process such that 1608(3) is now turned on. This creates a condition that the output voltage Vout is now equal to the voltage of 1616(4) plus the input voltage, $V_{in}$, across 1616(3), which yields $2V_{in}$. Note that the output has a staircase format since the output changes discretely at rising edges of the P pulses. FIG. 19 (B) shows switching of the MOSFET 1608(2), which leads to raising the output voltage to that of the voltage across 1616(4) plus 1616(3), plus the voltage of 1616(2), which is equal to $3V_{in}$.

Figure 20:
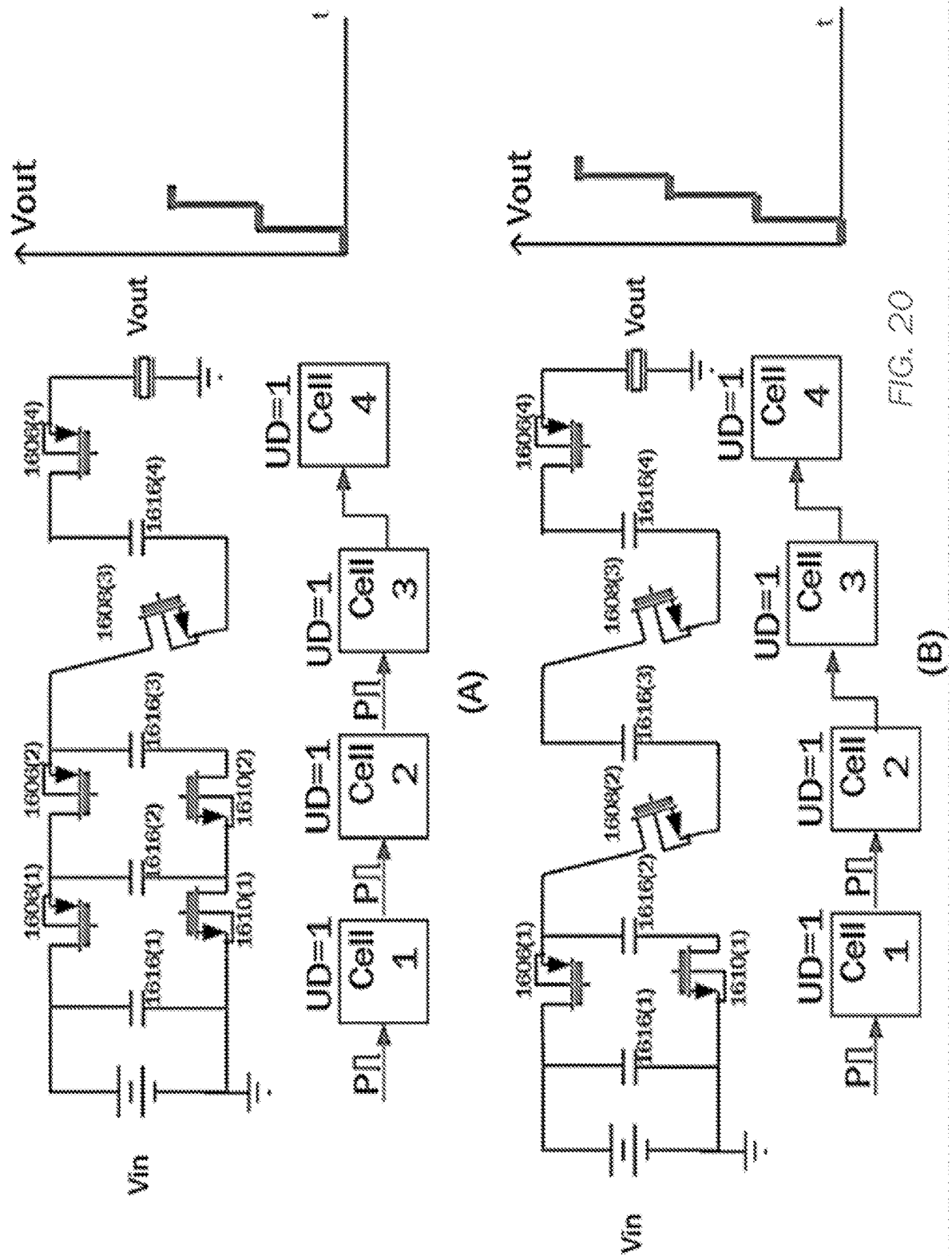
FIG. 20 is a diagram illustrating a further step-up state and transition to a step-down state of the distributed control topology of FIG. 16, in embodiments.
Figure 21:
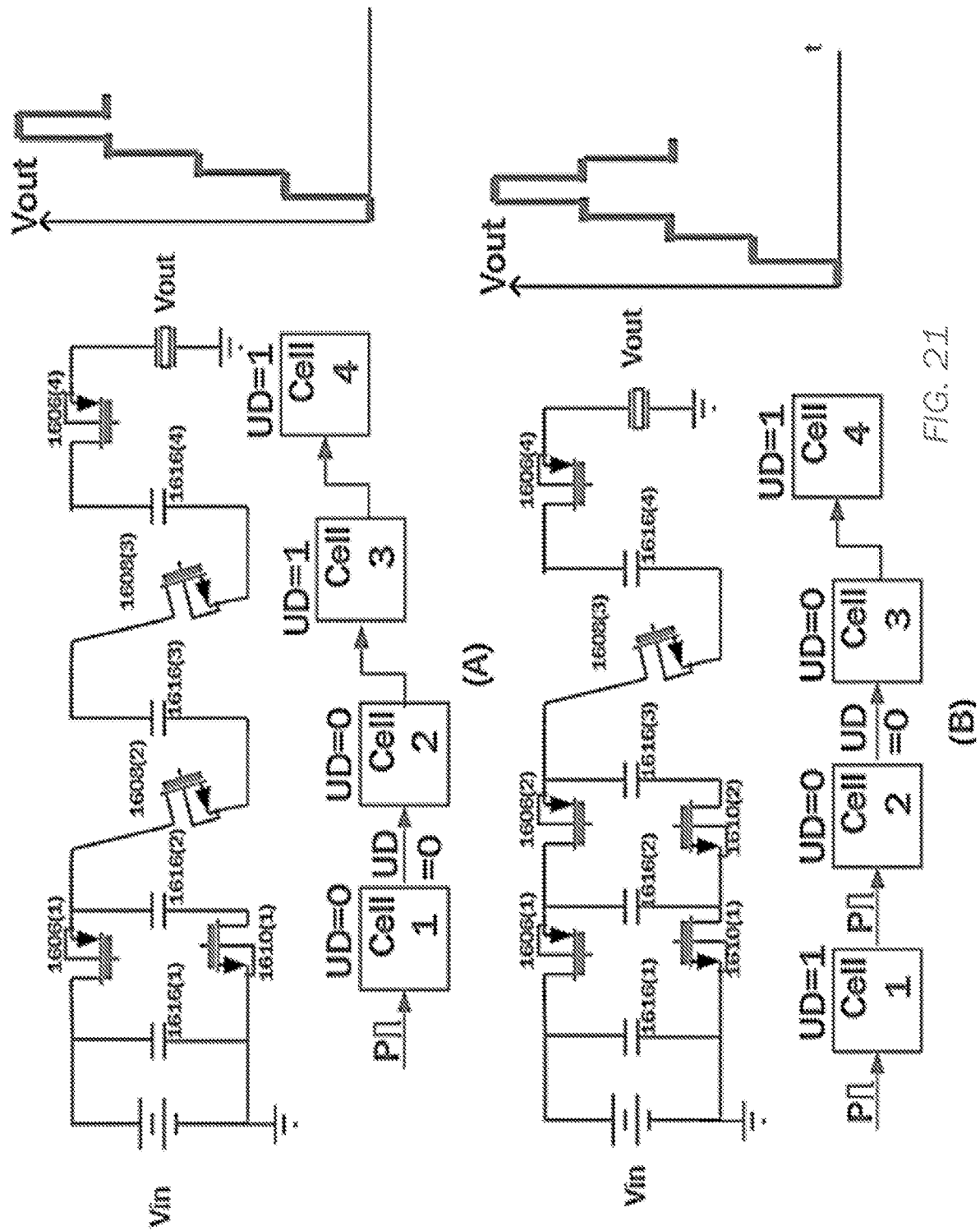
FIG. 21 is a diagram illustrating a step-down state of the distributed control topology of FIG. 16, in embodiments.

FIG. 20 (A) shows the last step of the stepping up process such that the output voltage is now equal to the sum of voltages across capacitors 1616(4),1616(3), 1616(2), and 1616(1), i.e., series connection of all individual cells' capacitors that were initially charged to the input voltage, $V_{in}$. FIG. 20(B) shows the output is held at its peak voltage level while the signal UD just transitioned from 1 to 0; the next P pulse will transition the process to the stepdown mode.

FIG. 21(A) shows the interval when MOSFETs 1606(1) and 1610(1) are turned on. At this point charge contained in capacitor 1616(1) is not necessarily transferred back to the input power source. Because of that, a primary battery may be used to power the input or a photovoltaic source. Any source that is not capable of receiving energy back would be useable, but it can also transfer energy back to the source if it is desirable. The energy may be stored in an energy storage element, for transfer back to the output in the next cycle. Section (B) in the figure continues the stepping down process with 1606(2) and 1610(2) turned back on. The output is equal to the value of 1616(4) in series with the voltage of the capacitors 1616(1), 1616(2), and 1616(3) which are all in parallel.

FIG. 22 (A) shows a continuation of the stepping down process with 1606(4) is turned on while 1608(4) has been turned off (not shown). The capacitor of each cell is now in parallel and the output is equal to the voltage of the parallel capacitors. In the figures (B) portion the MOSFET 1608(4) is turned on and the output falls to ground.

Figure 23:
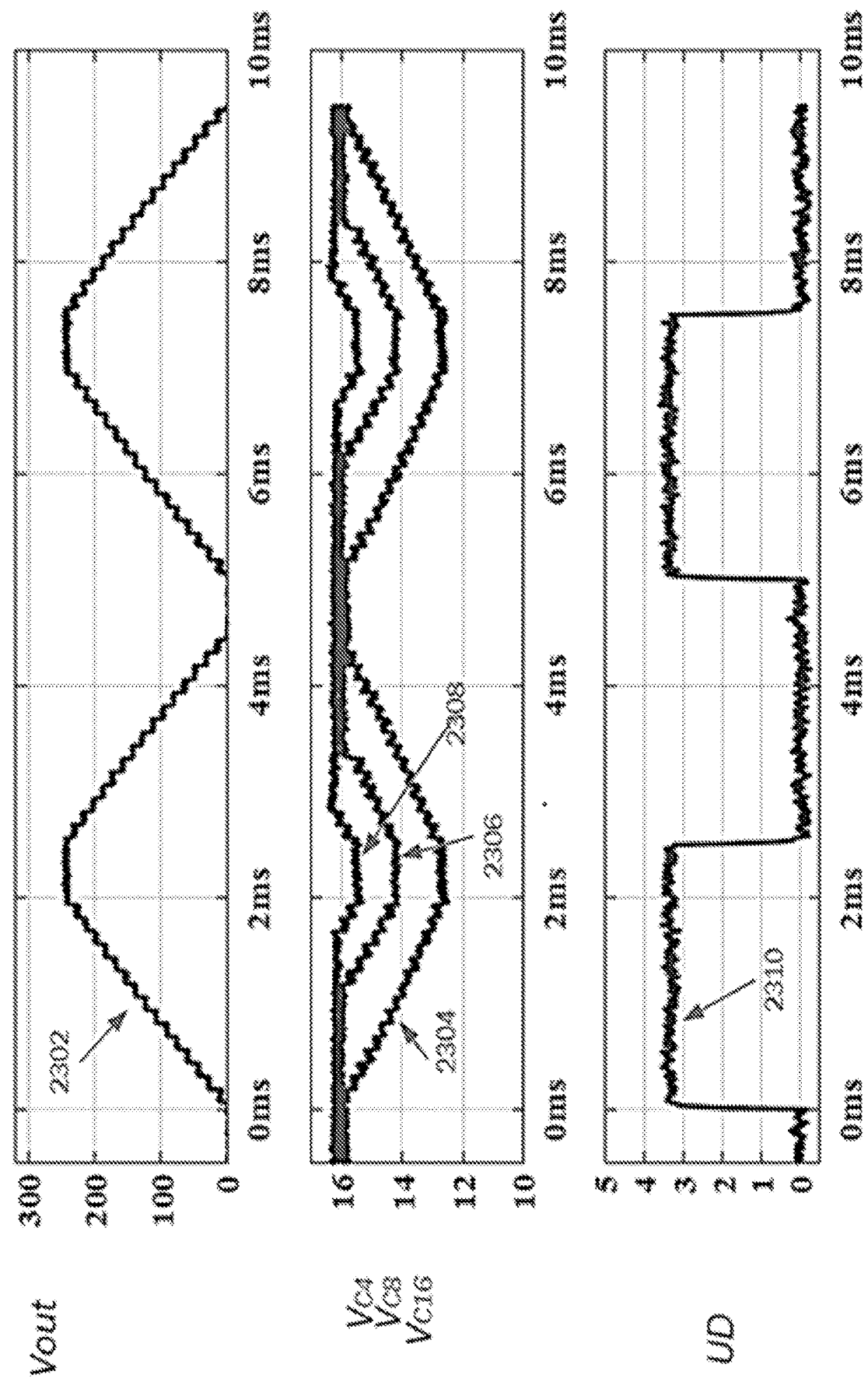
FIG. 23 Is a graph showing the measured output of a 16-cell daisy chained sequential driving circuit driving an output.

FIG. 23 shows a waveform from a from daisy chained sequential driving circuit that was tested. It is a 16-cell circuit as shown in FIG. 16. The graph shows the plot of voltages $V_{out}$ (2302), $V_{C16}$ (2304) the voltage across capacitor 1616(16), $V_{C8}$ (2306) the voltage across capacitor 1616(8), $V_{C4}$ (2308) the voltage across 1616(4), and signal UD (2310) that is fed into each FSM. The graph shows that $V_{out}$ starts ramping up when the UD voltage (2310) transitions from ground to a positive value equal to a logic "1". The $V_{out}$ ramps up in a stepwise manner as cells are converted from parallel to series. As $V_{out}$ increases $V_{C16}$ decreases as it transfers energy out to the load. $V_{C8}$ holds its charge until cell 8 is converted to a series cell. At that point it also decreases step by step as energy is transferred to the output. $V_{C4}$ stays constant until cell 4 is converted and starts to transition its energy to the output. Vout reaches its maximum 16 steps into the process. $V_{C16}$ $V_{C8}$, and $V_{C4}$ are all at their minimums when $V_{out}$ is at its maximum. $V_{C16}$ decreases the most because the capacitor in cell 16 is connected to the output for the longest period of time and transfers the most energy. $V_{C4}$ decreases the least because it is connected to the output for the least amount of time and delivers least energy of the three. Although, for simplicity of explanation, the graph shows only three cells, the same effect is true for all 16 cells. The capacitor in a cell that is closer to the load, delivers more energy and decreases more in voltage.

$V_{out}$ then starts ramping down when signal UD transitions to a logic "0". As it steps down the voltage across each capacitor increases. Energy is transferring back to the capacitors from the output. The capacitor in cell 16 receives the most energy because it is connected to the load for the longest period of time and the capacitor in cell 4 receives less energy because it is connected for a shorter period of time.

Note that the energy is not transferred back to its power source, but rather recovers energy and stores it in the capacitors. This energy recovery increases system efficiency. It is a good architecture for unidirectional power sources such as primary batteries as well as solar arrays to mention two unipolar source examples. It is also an ideal architecture to drive piezoelectric devices and for interfacing Haptic systems and devices.

Note also that in the example presented that all 16 cells were converted from the cell connected to the output, cell 16, back to the cell connected to the input cell 1. There can be other patterns such that cell 16 is not the first cell converted and connected to the output without departing from the scope hereof. For example, the first cell, the cell connected to the input may be converted first then each adjacent cell from cell 2 to 16 can be converted to series. An arbitrary pattern may be implemented. Different patterns will also affect the energy that is transferred from each capacitor.

Figure 24:
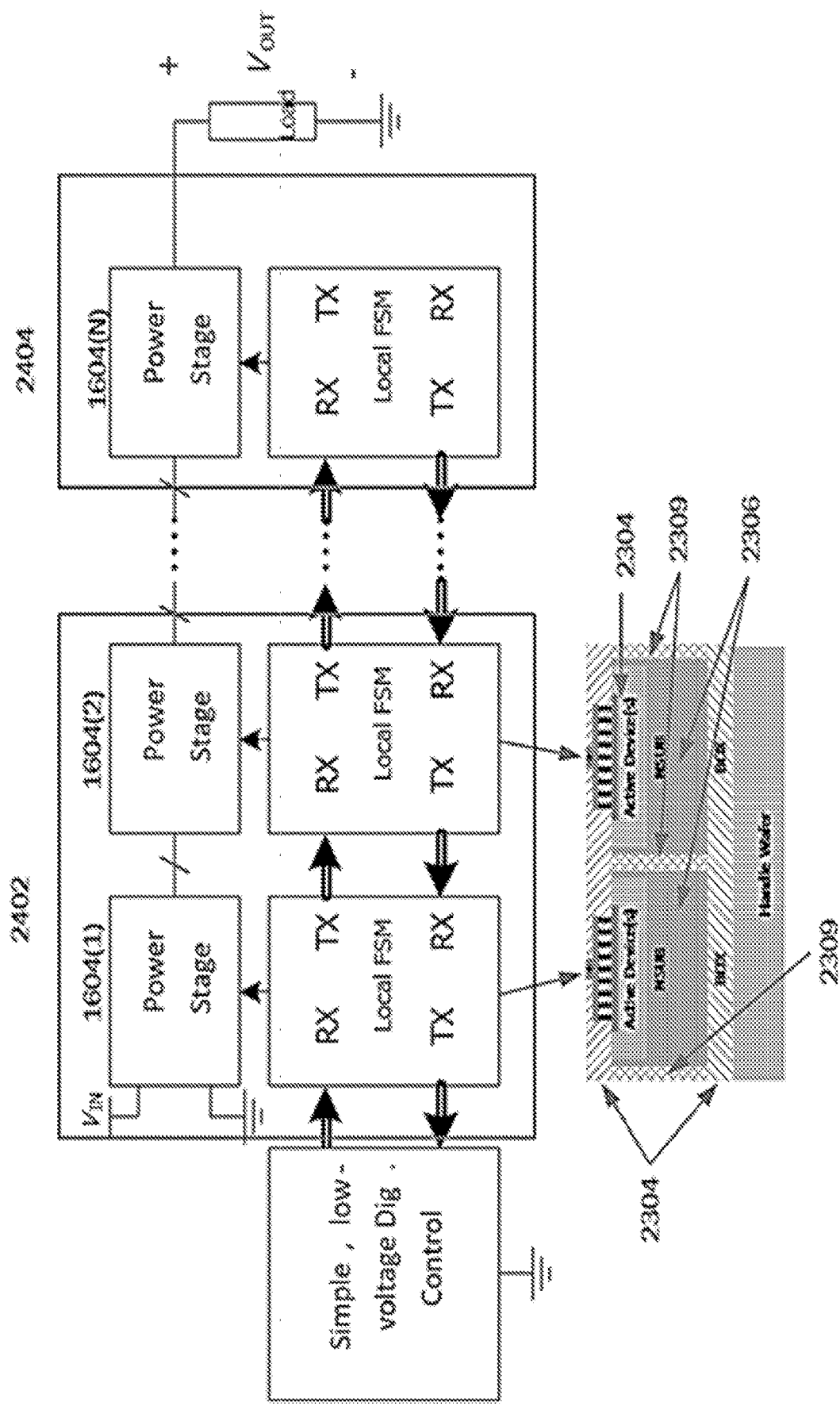
FIG. 24 Is a diagram showing a sequential driving circuit and its partition on a single integrated circuit.

FIG. 24 shows a chip partitioned such that a group of cells are placed on a single chip. This is accomplished by the switched capacitor architecture using the scalable distributed daisy-chain control approach to pass signal information along a floating 'stack' of switching cells, each isolated in a 650V deep-trench SOI well. By distributing control into local finite state machines (FSMs), high-voltage level shifters are eliminated, simplifying off-chip control to a 2b clock+Up/Down control signal. This makes the architecture extensible to an arbitrary number of cells—even across chip-to-chip boundaries. The voltage range is extended to over 300Vpp, using only 5V/20V rated devices with measurements showing an approximate 10-time reduction in power consumption compared to conventional hard-switching drivers.

A chip, defined by boundary 2402 comprises cells 6404 (1) and 6404(2), which are placed on a chip. In this application all 16 cells may be placed on a single chip. A separate collection of cells is placed on a chip 2404 that can be connected to chip 2402 and act as a group of interconnected cells. The chip itself can be Silicon on Insulator (SOI) but electronic devices could also be isolated by using semiconductor junctions. All the electronic active devices 2304 within the chip sits on an N-type doped substrate 2306 with insulator oxide material surrounding it 2304, with oxide trenches used for voltage standoff 2309.

The deep-trench Silicon on Insulator (SOI) well provides a 650V of isolation boundary.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall there between.

Combination of Features

Features described above as well as those claimed below may be combined in various ways without departing from the scope hereof. The following examples illustrate possible, non-limiting combinations of features and embodiments described above. It should be clear that other changes and modifications may be made to the present embodiments without departing from the spirit and scope of this invention:

(A1) In an embodiment of a first aspect, method for sequentially driving an electrical load includes: controlling N switching cells, where each of the N switching cells is electrically coupled to a respective one of N energy elements, such that the N energy elements are electrically coupled in a first topology to drive the electrical load with a first voltage, N being an integer greater than one; and controlling the N switching cells such that N energy elements are electrically coupled in a second topology that is different from the first topology, to drive the electrical load with a second voltage that is different from the first voltage.

(A2) In the embodiment (A1), each step of controlling comprises causing each of the N switching cells to operate in either a respective series operating state or a respective parallel operating state.

(A3) In the embodiment (A1)-(A2), controlling the N switching cells such that the N energy elements are electrically coupled in a third topology that is different from each of the first topology and the second topology, to drive the electrical load with a third voltage that is different from each of the first voltage and the second voltage.

(A4) In the embodiment (A1)-(A3), the N energy elements are electrically coupled in series, in one of the first and second topologies, and the N energy elements are electrically coupled in a series-parallel combination, in the other one of the first and second topologies.

(A5) In the embodiment (A1)-(A4), the N energy elements are electrically coupled in parallel, in one of the first and second topologies, and the N energy elements are electrically coupled in a series-parallel combination, in the other one of the first and second topologies.

(A6) In the embodiment (A1)-(A5), the N energy elements are electrically coupled in a first series-parallel combination, in one of the first and second topologies, and the N energy elements are electrically coupled in a second series-parallel combination, in the other one of the first and second topologies, the second series-parallel combination being different from the first series-parallel combination.

(A7) In the embodiment (A1)-(A6), at least one of the N energy elements comprises a respective electrical power source.

(A8) In the embodiment (A1)-(A7), at least one of the N energy elements comprises a respective energy storage cell.

(A9) In the embodiment (A1)-(A8), a magnitude of a difference between the second voltage and the first voltage is equal to a respective voltage across at least one of N energy elements.

(A10) In the embodiment (A1)-(A9), each step of controlling comprises, for each of the N switching cells, simultaneously, causing at least one switching device of the switching cell to operate in its on-state and causing at least one switching device of the switching cell to operate in its off-state.

(A11) In the embodiment (A1)-(A10), the electrical load comprises a capacitive load.

(B1) In an embodiment in a second aspect a sequential electrical driving circuit including: N energy elements, N being an integer greater than one, N switching cells, each of the N switching cells being electrically coupled to a respective one of the N energy elements, and a controller configured to control the N switching cells such that the N energy elements are electrically coupled in a first topology, to drive an electrical load with a first voltage, and control the N switching cells such that N energy elements are electrically coupled in a second topology that is different from the first topology, to drive the electrical load with a second voltage that is different from the first voltage.

(B2) In the embodiment (B1), at least one of the N energy elements includes a respective electrical power source.

(B3) In the embodiment (B1)-(B2), at least one of the N energy elements includes a respective energy storage cell.

(B4) In the embodiment (B3), each energy storage cell of the N energy elements comprises one or more of a battery, a capacitor, and a fuel cell.

(B5) In the embodiment B(1)-B(4), the controller is further configured to control respective operating states of the N switching cells by causing each of the N switching cells to operate in either a respective series operating state or a respective parallel operating state.

(B6) In the embodiment (B1)-(B5), at least a first one of the N switching cells includes: an input port, an output port, a first parallel switching device electrically coupled between a positive node of the input port and a positive node of the output port, a second parallel switching device electrically coupled between a negative node of the input port and a negative node of the output port; and a series switching device electrically coupled between the positive node of the input port and the negative node of the output port.

(B7) In the embodiment (B1)-(B6), the controller is further configured, for the first one of the N switching cells, to cause the switching cell to operate in a series operating state by causing each of the first and second parallel switching devices to operate in its respective off-state, and causing the series switching device to operate in its respective on-state, and cause the switching cell to operate in a parallel operating state by, causing each of the first and second parallel switching devices to operate in its respective on-state, and causing the series switching device to operate in its respective off-state.

(B8) In the embodiment (B1)-(B7), the first one of the N switching cells, each of the first parallel switching device, the second parallel switching device, and the series switching device comprises a respective transistor.

(B9) In the embodiment (B1)-(B8), the first one of the N switching cells, the input port is electrically coupled to one of the N energy elements, and the output port is electrically coupled to another one of the N energy elements.

(C1) In an embodiment in a second aspect a sequential electrical driving circuit including: N energy elements, N being an integer greater than one, N switching cells, each of the N switching cells being electrically coupled to a respective one of the N energy elements, and each of the N switching cells contain a finite state machine that forms a distributed controller the controller configured to control the N switching cells such that the N energy elements are electrically coupled in a first topology, to drive an electrical load with a first voltage, and control the N switching cells such that N energy elements are electrically coupled in a second topology that is different from the first topology, to drive the electrical load with a second voltage that is different from the first voltage.

(C2) In the embodiment (C1), at least one of the N energy elements includes a respective electrical power source.

(C3) In the embodiment (C1)-(C2), at least one of the N energy elements includes a respective energy storage cell.

(C4) In the embodiment (C3), each energy storage cell of the N energy elements comprises one or more of a battery, a capacitor, and a fuel cell.

(C5) In the embodiment (C1)-(C4), the controller is further configured to control respective operating states of the N switching cells by causing each of the N switching cells to operate in either a respective series operating state or a respective parallel operating state.

(C6) In the embodiment (C1)-(C5), at least a first one of the N switching cells includes: an input port, an output port, a first parallel switching device electrically coupled between a positive node of the input port and a positive node of the output port, a second parallel switching device electrically coupled between a negative node of the input port and a negative node of the output port; and a series switching device electrically coupled between the positive node of the input port and the negative node of the output port.

(C7) In the embodiment (C1)-(C6), the controller is further configured, for the first one of the N switching cells, to cause the switching cell to operate in a series operating state by causing each of the first and second parallel switching devices to operate in its respective off-state, and causing the series switching device to operate in its respective on-state, and cause the switching cell to operate in a parallel operating state by, causing each of the first and second parallel switching devices to operate in its respective on-state, and causing the series switching device to operate in its respective off-state.

(C8) In the embodiment (C1)-(C7), the first one of the N switching cells, each of the first parallel switching device, the second parallel switching device, and the series switching device comprises a respective transistor.

(C9) In the embodiment (C1)-(C8), the first one of the N switching cells, the input port is electrically coupled to one of the N energy elements, and the output port is electrically coupled to another one of the N energy elements.

What is claimed is:

1. A method for sequentially driving an electrical load, comprising:
   controlling N switching cells, where each of the N switching cells is electrically coupled to a respective one of N energy elements, such that the N energy elements are electrically coupled in a first topology to drive the electrical load with a first voltage, N being an integer greater than one; and controlling the N switching cells such that N energy elements are electrically coupled in a second topology that is different from the first topology, to drive the electrical load with a second voltage that is different from the first voltage;

at least a first switching cell of the N switching cells including:
an input port;
an output port;
a first parallel switching device electrically coupled between a positive node of the input port and a positive node of the output port;
a second parallel switching device electrically coupled between a negative node of the input port and a negative node of the output port; and
a series switching device electrically coupled between the positive node of the input port and the negative node of the output port.

2. The method of claim 1, wherein each step of controlling comprises causing each of the N switching cells to operate in either a respective series operating state or a respective parallel operating state.

3. The method of claim 1, further comprising controlling the N switching cells such that the N energy elements are electrically coupled in a third topology that is different from each of the first topology and the second topology, to drive the electrical load with a third voltage that is different from each of the first voltage and the second voltage.

4. The method of claim 1, wherein the N energy elements are electrically coupled in series, in one of the first and second topologies, and the N energy elements are electrically coupled in a series-parallel combination, in the other one of the first and second topologies.

5. The method of claim 1, wherein the N energy elements are electrically coupled in parallel, in one of the first and second topologies, and the N energy elements are electrically coupled in a series-parallel combination, in the other one of the first and second topologies.

6. The method of claim 1, wherein the N energy elements are electrically coupled in a first series-parallel combination, in one of the first and second topologies, and the N energy elements are electrically coupled in a second series-parallel combination, in the other one of the first and second topologies, the second series-parallel combination being different from the first series-parallel combination.

7. The method of claim 1, wherein at least one of the N energy elements comprises a respective electrical power source.

8. The method of claim 7, wherein at least one of the N energy elements comprises a respective energy storage cell.

9. The method of claim 1, wherein a magnitude of a difference between the second voltage and the first voltage is equal to a respective voltage across at least one of N energy elements.

10. The method of claim 1, wherein each step of controlling comprises, for each of the N switching cells, simultaneously (a) causing at least one switching device of the switching cell to operate in its on-state and (b) causing at least one switching device of the switching cell to operate in its off-state.

11. The method of claim 1, wherein the electrical load comprises a capacitive load.

12. A sequential electrical driving circuit, comprising:
N energy elements, N being an integer greater than one;
N switching cells, each of the N switching cells being electrically coupled to a respective one of the N energy elements; and a controller that
(a) controls the N switching cells such that the N energy elements are electrically coupled in a first topology, to drive an electrical load with a first voltage, and
(b) controls the N switching cells such that N energy elements are electrically coupled in a second topology that is different from the first topology, to drive the electrical load with a second voltage that is different from the first voltage;

at least a first switching cell of the N switching cells including:
an input port;
an output port;
a first parallel switching device electrically coupled between a positive node of the input port and a positive node of the output port;
a second parallel switching device electrically coupled between a negative node of the input port and a negative node of the output port; and
a series switching device electrically coupled between the positive node of the input port and the negative node of the output port.

13. The sequential electrical driving circuit of claim 12, wherein at least one of the N energy elements includes a respective electrical power source.

14. The sequential electrical driving circuit of claim 13, wherein at least one of the N energy elements includes a respective energy storage cell.

15. The sequential electrical driving circuit of claim 14, wherein each energy storage cell of the N energy elements comprises one or more of a battery, a capacitor, and a fuel cell.

16. The sequential electrical driving circuit of claim 12, wherein the controller is further configured to control respective operating states of the N switching cells by causing each of the N switching cells to operate in either a respective series operating state or a respective parallel operating state.

17. The sequential electrical driving circuit of claim 12, wherein the controller is further configured, for the first one of the N switching cells, to:
cause the switching cell to operate in a series operating state by:
causing each of the first and second parallel switching devices to operate in its respective off-state, and
causing the series switching device to operate in its respective on-state; and
cause the switching cell to operate in a parallel operating state by:
causing each of the first and second parallel switching devices to operate in its respective on-state, and
causing the series switching device to operate in its respective off-state.

18. The sequential electrical driving circuit of claim 12, wherein in the first one of the N switching cells, each of the first parallel switching device, the second parallel switching device, and the series switching device comprises a respective transistor.

19. The sequential electrical driving circuit of claim 12, wherein in the first one of the N switching cells, the input port is electrically coupled to one of the N energy elements, and the output port is electrically coupled to another one of the N energy elements.

20. A sequential electrical driving circuit, comprising:
N energy elements, N being an integer greater than one;
N switching cells, each of the N switching cells being electrically coupled to a respective one of the N energy elements; and each of the N switching cells contain a finite state machine that forms a distributed controller; the controller that
(a) controls the N switching cells such that the N energy elements are electrically coupled in a first topology, to drive an electrical load with a first voltage, and
(b) controls the N switching cells such that N energy elements are electrically coupled in a second topology that is different from the first topology, to drive the electrical load with a second voltage that is different from the first voltage;
at least a first switching cell of the N switching cells including:
an input port;
an output port;
a first parallel switching device electrically coupled between a positive node of the input port and a positive node of the output port;
a second parallel switching device electrically coupled between a negative node of the input port and a negative node of the output port; and
a series switching device electrically coupled between the positive node of the input port and the negative node of the output port.

21. The sequential electrical driving circuit of claim 20, wherein at least one of the N energy elements includes a respective electrical power source.

22. The sequential electrical driving circuit of claim 21, wherein at least one of the N energy elements includes a respective energy storage cell.

23. The sequential electrical driving circuit of claim 22, wherein each energy storage cell of the N energy elements comprises one or more of a battery, a capacitor, and a fuel cell.

24. The sequential electrical driving circuit of claim 20, wherein the controller is further configured to control respective operating states of the N switching cells by causing each of the N switching cells to operate in either a respective series operating state or a respective parallel operating state.

25. The sequential electrical driving circuit of claim 20, wherein the controller is further configured, for the first one of the N switching cells, to:
cause the switching cell to operate in a series operating state by:
causing each of the first and second parallel switching devices to operate in its respective off-state, and
causing the series switching device to operate in its respective on-state; and
cause the switching cell to operate in a parallel operating state by:
causing each of the first and second parallel switching devices to operate in its respective on-state, and
causing the series switching device to operate in its respective off-state.

26. The sequential electrical driving circuit of claim 20, wherein in the first one of the N switching cells, each of the first parallel switching device, the second parallel switching device, and the series switching device comprises a respective transistor.

27. The sequential electrical driving circuit of claim 20, wherein in the first one of the N switching cells, the input port is electrically coupled to one of the N energy elements, and the output port is electrically coupled to another one of the N energy elements.

* * * * *